(12) United States Patent
Arai

(10) Patent No.: US 11,221,805 B2
(45) Date of Patent: Jan. 11, 2022

(54) VIRTUAL DEVICE, OPERATING SYSTEM, VIRTUAL DEVICE SERVICE, INFORMATION PROCESSING APPARATUS, AND METHOD OF CONTROLLING INFORMATION PROCESSING APPARATUS

(71) Applicant: CANON KABUSHIKI KAISHA, Tokyo (JP)

(72) Inventor: Norihiro Arai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/885,005

(22) Filed: May 27, 2020

(65) Prior Publication Data

US 2020/0379689 A1 Dec. 3, 2020

(30) Foreign Application Priority Data

May 30, 2019 (JP) .............................. JP2019-101508

(51) Int. Cl.
*G06F 3/12* (2006.01)

(52) U.S. Cl.
CPC .......... *G06F 3/1206* (2013.01); *G06F 3/1204* (2013.01); *G06F 3/1209* (2013.01); *G06F 3/1231* (2013.01); *G06F 3/1254* (2013.01)

(58) Field of Classification Search
None
See application file for complete search history.

(56) References Cited

U.S. PATENT DOCUMENTS

| 2012/0254898 A1 | 10/2012 | Nakata | |
| 2014/0300914 A1* | 10/2014 | Yamazaki | G06F 3/1285 |
| | | | 358/1.13 |
| 2016/0162227 A1* | 6/2016 | Kato | G06F 3/1291 |
| | | | 358/1.13 |

FOREIGN PATENT DOCUMENTS

| EP | 2492794 A2 | 8/2012 |
| JP | 2016-110520 A | 6/2016 |

\* cited by examiner

*Primary Examiner* — Lennin R Rodriguezgonzalez
(74) *Attorney, Agent, or Firm* — Canon U.S.A., Inc. IP Division

(57) ABSTRACT

A virtual printer A generated in a virtual printer service included in a host computer including an OS uses a search request receiver to receive a device search request from the OS, and uses a search request responder to respond to the received device search request. Further, a print job receiver receives a print job from the OS, which has registered the virtual printer A as a transmission destination of the print job based on the response, in accordance with a specific protocol. Then, a print job converter converts the received print job, and a print job transmitter transmits the converted print job to a printer AY, which does not support the specific protocol, via a job generator in accordance with a protocol different from the specific protocol.

34 Claims, 20 Drawing Sheets

VIRTUAL DEVICE, OPERATING SYSTEM, VIRTUAL DEVICE SERVICE, INFORMATION PROCESSING APPARATUS, AND METHOD OF CONTROLLING INFORMATION PROCESSING APPARATUS

BACKGROUND OF THE INVENTION

Field of the Invention

The aspect of the embodiments relates to a virtual device included in an information processing apparatus including an operating system, an operating system, a virtual device service, an information processing apparatus, and a method of controlling an information processing apparatus.

Description of the Related Art

In general, in order to use a peripheral device, for example, an image forming apparatus, through an information processing apparatus, a specific device driver that supports the peripheral device is installed into an operating system (hereinafter referred to as "OS") operating on the information processing apparatus. That is, to use an image forming apparatus, a printer driver for the image forming apparatus is installed for use.

Meanwhile, in recent years, some OSes have introduced therein a printing system that enables printing by using a specific protocol without using a printer driver. For example, a printing system that supports, for example, AirPrint (trademark) provided by Apple Inc., or Mopria (trademark) provided by Android (trademark) of Google Inc. or Windows (trademark) of Microsoft Corporation has been introduced. In this case, a printer driver that supports the image forming apparatus is not required to be installed into the OS, and the OS executes both of generation of a print job and transmission of the print job to the image forming apparatus (e.g., refer to Japanese Patent Application Laid-Open No. 2016-110520). AirPrint is a part of the function of the OS.

However, an image forming apparatus that does not support a printing system enabling printing without using a printer driver cannot interpret a print job even when the image forming apparatus
has received the print job from the OS. In view of this, we are considering to create, in an information processing apparatus, a virtual image forming apparatus (hereinafter referred to as "virtual device") capable of receiving a print job from the OS, and cause this virtual device to transmit the received print job to the image forming apparatus. To achieve this, the OS is used to find the virtual device.

SUMMARY OF THE INVENTION

According to one embodiment of the disclosure, there is provided a virtual device, which is included in an information processing apparatus including an operating system, the virtual device being configured to cause the information processing apparatus to execute: receiving a device search request from the operating system; responding to the received device search request; receiving a print job from the operating system that has registered the virtual device as a transmission source of a print job based on the response; and transmitting the received print job to an image forming apparatus.

Further features of the disclosure will become apparent from the following description of exemplary embodiments with reference to the attached drawings.

DESCRIPTION OF THE EMBODIMENTS

First Embodiment

Figure 1:
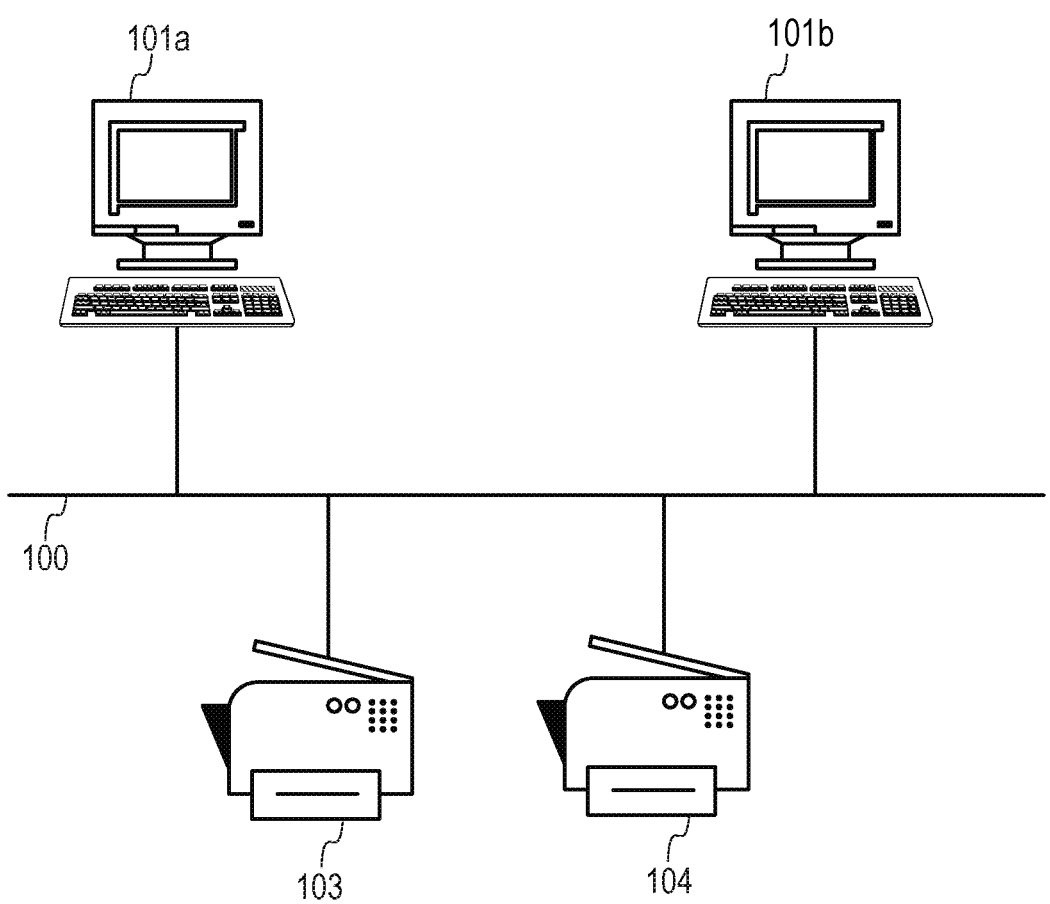
FIG. 1 is a diagram for illustrating an example of an overall configuration of a printing system in at least one embodiment of the disclosure.

FIG. 1 is a diagram for illustrating an example of an overall configuration of a printing system in a first embodiment of the disclosure.

The printing system in the first embodiment includes host computers 101a and 101b and printers 103 and 104.

The host computers 101a and 101b are an example of an information processing apparatus, for example, a personal computer (PC). The printers 103 and 104 are image forming apparatus configured to receive print data in the format of a page description language (hereinafter referred to as "PDL") or raster format and execute printing.

Those apparatus can communicate to/from one another via a network 100. The network 100 is, for example, a local area network (LAN) or an intranet, and can include a wide area network (WAN).

The printers 103 and 104 may be single function printers having only the printing function, or multifunction printers having a printing function, a scanning function, and a copying function.

Further, only one host computer or printer may be connected to the network 100, or three or more host computers or printers may be connected to the network 100.

In the following description, when the host computers 101a and 101b is described without distinction, the host computers 101a and 101b are simply described as a host computer 101 by omitting suffixes of "a" and "b", for example. Further, each component of the host computers 101a and 101b is also described by omitting the suffixes of "a" and "b".

Figure 2:
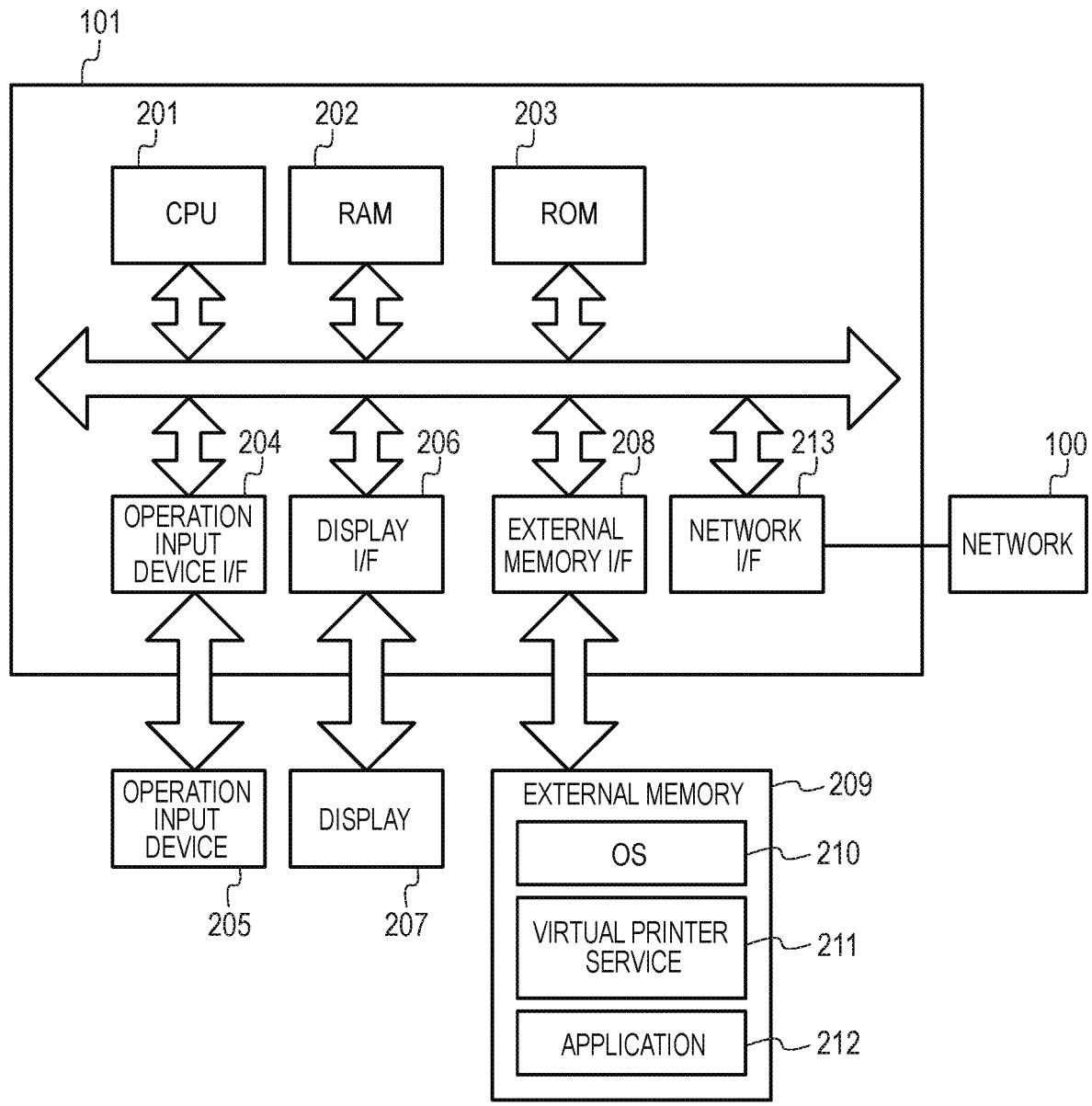
FIG. 2 is a hardware configuration diagram of an information processing apparatus capable of serving as a host computer.

FIG. 2 is a diagram for illustrating an example of a hardware configuration of the information processing apparatus capable of serving as the host computer 101.

A controller including a CPU 201 is configured to control an overall operation of the host computer 101. The CPU 201 loads a program stored in a ROM 203 or an external memory 209 into a RAM 202, and executes the program to perform various kinds of control such as control of a user interface (hereinafter referred to as "UI") screen, generation of print data, and transfer of the print data.

The RAM 202 is a main memory of the CPU 201, and is used as a working area or a temporary memory area for loading various kinds of programs. The ROM 203 stores, for example, a control program or boot program that can be executed by the CPU 201. An external memory I/F 208 is an interface for connecting the external memory 209 to the controller. The external memory 209 stores, for example, an operating system (OS) 210, a virtual printer service 211, and an application 212.

In the first embodiment, an auxiliary storage device, for example, a hard disk drive (HDD) is assumed as the external memory 209. However, a non-volatile memory, for example, a solid state drive (SSD) may be used instead of or in combination with the HDD. In this manner, hardware components such as the CPU 201, the RAM 202, the ROM 203, and the external memory 209 construct a so-called computer.

An operation input device I/F 204 is an interface for controlling an operation input device 205 such as a keyboard, a pointing device (mouse), or a touch input device. The operation input device 205 functions as a receiver configured to receive an operation from the user.

The display I/F 206 is configured to control display of a screen on the display 207. The display 207 functions as a display configured to display information to the user.

The host computer 101 is connected to the network 100 via a network I/F 213. The network I/F 213 is configured to transmit print data to the printers 103 and 104 on the network 100, or perform communication to/from the printers 103 and 104 on the network 100 via the Internet, for example. Communication of data to/from an external terminal on the network 100 is, for example, wireless communication based on the IEEE 802.11 series, or communication via a wired cable, for example, a LAN cable.

The external memory 209 of the host computer in the first embodiment has installed therein the OS 210, the virtual printer service 211 described later, and various kinds of applications 212, for example. Those pieces of software load a program stored in the ROM 203 or the external memory 209 into the RAM 202, and are executed by the CPU 201 to implement functions of those pieces of software described below.

Figure 3:
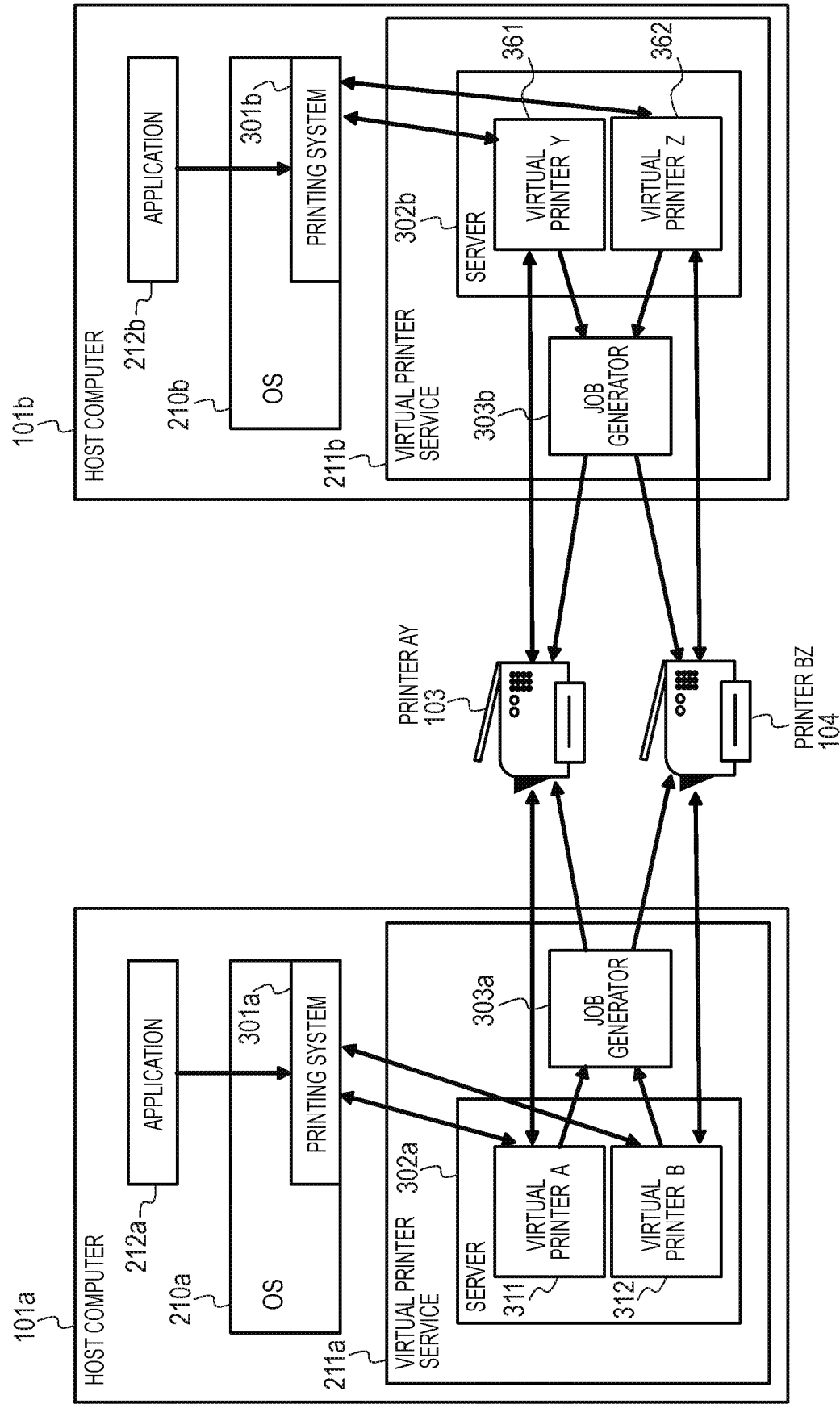
FIG. 3 is a software configuration diagram of the host computer.

FIG. 3 is a diagram for illustrating a software configuration of the host computers 101a and 101b.

There is a printing system 301a as one function of the OS 210a installed in the host computer 101a. The printing system 301a is configured to control a printing operation caused by the host computer 101a. The printing system 301a is a printing system that enables printing by using a specific protocol without using a printer driver. For example, the printing system 301a is a printing system that supports, for example, AirPrint (trademark) provided by Apple Inc., or Mopria (trademark) provided by Android (trademark) of Google Inc. or Windows (trademark) of Microsoft Corporation.

The virtual printer service 211a includes a job generator 303a and a server 302a.

The server 302a is configured to generate a virtual printer A 311 and a virtual printer B 312. In this example, the virtual printer A 311 is generated in association with a printer AY 103 being an actual printer. Similarly, the virtual printer B 312 is generated in association with a printer BZ 104 being an actual printer.

When the virtual printer A 311 or the virtual printer B 312 has received a printer search request (device search request) based on a predetermined search protocol from the OS 210a, the virtual printer A 311 or the virtual printer B 312 returns printer information in accordance with the above-mentioned search protocol. Further, the virtual printer A 311 or the virtual printer B 312 also uses the above-mentioned search protocol to perform communication, for example, detection of the state of the associated printer AY 103 or printer BZ 104. In the first embodiment, description is made by using a Bonjour (trademark) protocol provided by Apple Inc. as an example of the search protocol supported by the OS 210 of the host computer 101. In the Bonjour protocol, the technology of Multicast DNS is used for searching for a device. The search protocol is not limited to the Bonjour protocol, and other protocols with similar functions may be employed as the search protocol.

The virtual printer A 311 (virtual printer B 312) is configured to receive a print job from the printing system 301a of the OS 210, which has registered therein the virtual printer A 311 (virtual printer B 312) as a transmission destination of the print job based on a response to the above-mentioned search request. The virtual printer A 311 (virtual printer B 312) converts the received print job into a predetermined format that can be interpreted by the job generator 303a, and transmits the print job having the format to the job generator 303a. The job generator 303a serves to use the print job received by each virtual printer from the printing system 301a to generate a print job having a format that can be processed by an actual printer (printer AY 103 or printer BZ 104), and transmit the print job to the actual printer. The virtual printer may include the function of the job generator 303. That is, the virtual printer may generate a print job that can be processed by the actual printer based on the received print job, and transmit the print job to the actual printer.

The host computer 101b also has a configuration similar to that of the host computer 101a. That is, there is a printing system 301b as one function of the OS 210b installed in the host computer 101b. The printing system 301b is configured to control a printing operation caused by the host computer 101b. The virtual printer service 211b includes a job generator 303b and a server 302b. The server 302b is configured to generate a virtual printer Y 361 and a virtual printer Z 362. In this example, the virtual printer Y 361 is generated in association with a printer AY 103 being an actual printer. Similarly, the virtual printer Z 362 is generated in association with a printer BZ 104 being an actual printer.

The virtual printer and the virtual printer service are also referred to as "virtual device" and "virtual device service", respectively.

Figure 4:
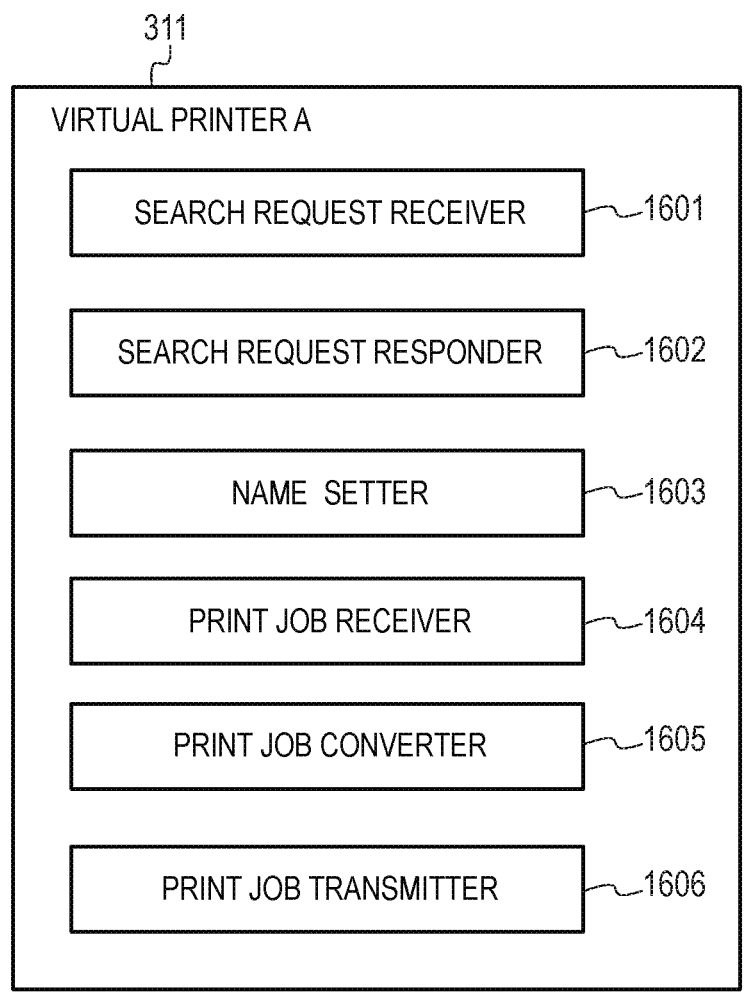
FIG. 4 is a software configuration diagram of a virtual printer.

FIG. 4 is a diagram for illustrating an example of a software configuration of the virtual printer. In FIG. 4, the virtual printer A 311 is described as an example. However, the same holds true for other virtual printers.

The virtual printer in the first embodiment includes a search request receiver 1601, a search request responder 1602, a name setter 1603, a print job receiver 1604, a print job converter 1605, and a print job transmitter 1606.

The search request receiver 1601 is configured to receive a request for searching for a printer based on the Bonjour protocol.

The search request responder 1602 is configured to return (respond) printer information by using the Bonjour protocol in response to the request for searching for a printer.

The search request receiver 1601 and the search request responder 1602 respond only to the search request based on the Bonjour protocol.

Figure 10:
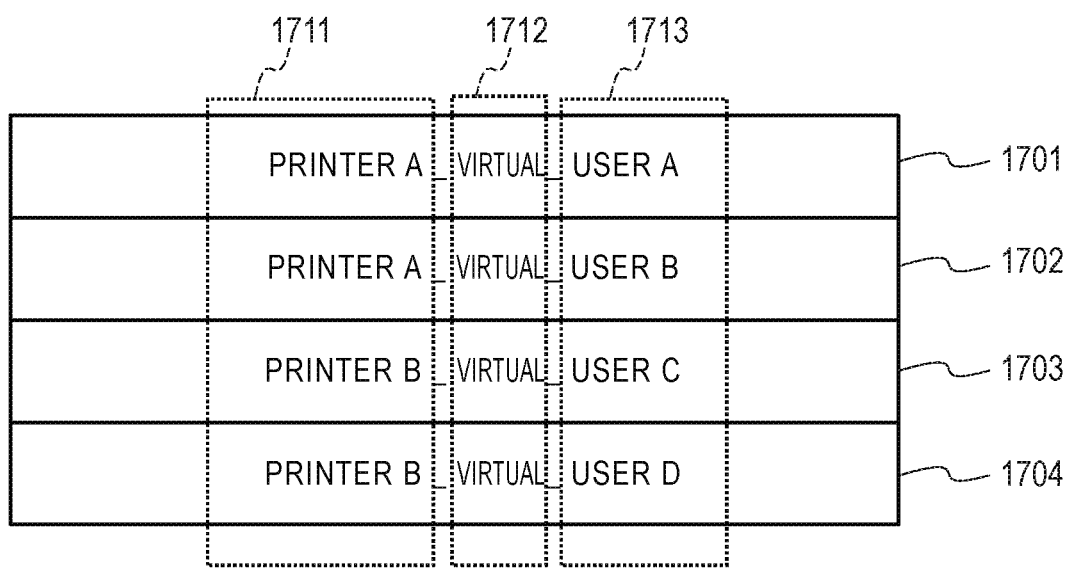
FIG. 10 is a diagram for illustrating an example of the printer name of the virtual printer to be notified by the virtual printer using a Bonjour protocol.

The name setter 1603 is configured to add an identifier to a printer name (device name) returned by the search request responder 1602 in response to the printer search request that is based on the Bonjour protocol. The identifier is illustrated in FIG. 10 described later.

The print job receiver 1604 is configured to receive a print job from the printing system 301a in accordance with a specific protocol. The print job receiver 1604 receives a print job generated by, for example, an application 212a included in the host computer 101a opening a file being a source of the print job and a user giving a printing instruction on the application. This application 212a includes various kinds of applications operable on the OS 210a, such as a word processing application, a spreadsheet application, a web browser application, an image-editing application.

The print job converter 1605 is configured to convert the print job received by the print job receiver 1604 into a format that can be recognized by the job generator 303a. The format that can be recognized by the job generator 303a is, for example, a PDF format. However, the format is not limited thereto.

The print job transmitter 1606 is configured to transmit the print job converted by the print job converter 1605 to the job generator 303a.

Figure 5:
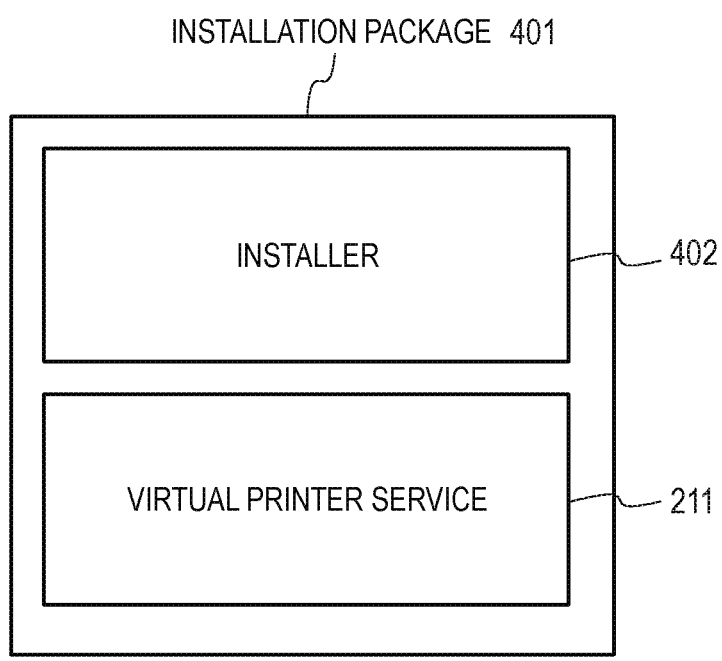
FIG. 5 is a software configuration diagram of an installation package of a virtual printer service.

FIG. 5 is a diagram for illustrating an example of a software configuration of an installation package for installing the virtual printer service.

An installation package 401 includes an installer 402 and the virtual printer service 211. When the installation package 401 is executed on the host computer 101, the installer 402 operates to execute processing of installing the virtual printer service 211 into the host computer 101. As a result of this installation processing, the virtual printer service 211 is stored into the external memory 209 of the host computer 101, and is loaded into the RAM 202 at the time of execution of the program to be executed by the CPU 201. The virtual printer service 211 is an application, and can generate a plurality of virtual printers.

Figure 6:
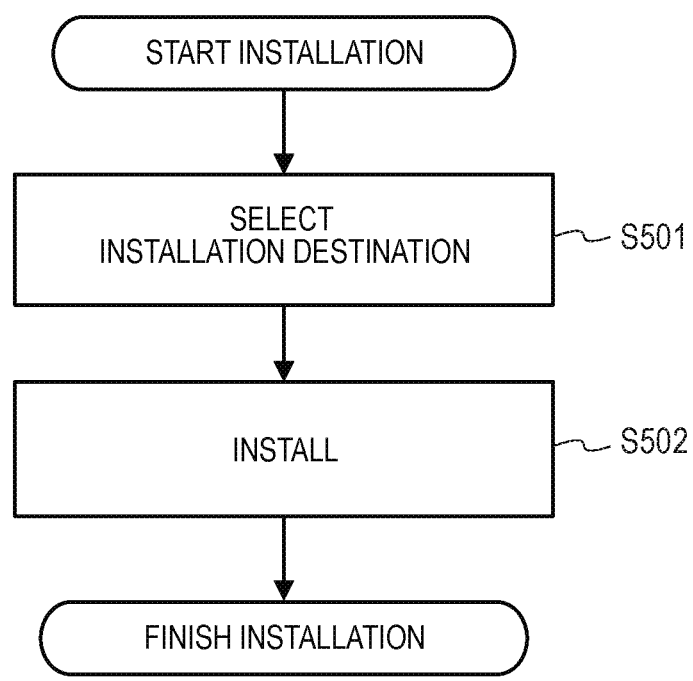
FIG. 6 is a flow chart for illustrating an example of processing of installing the virtual printer service.

FIG. 6 is a flow chart for illustrating an example of the processing of installing the virtual printer service 211. This installation processing is started by the OS 210 of the host computer executing the installation package 401 of the virtual printer service downloaded from a predefined website (or recorded in a recording medium, for example, a CD-ROM), for example.

In Step S501, the installer 402 included in the installation package 401 executes processing of selecting an installation destination of the virtual printer service. The installer 402 displays an installation destination selection screen (not shown) on the display 207 of the host computer 101, and acquires information on an installation destination input by the user on the installation destination selection screen. On the installation destination selection screen, a message indicating, for example, "Please select a disk for installing the virtual printer service" is displayed to prompt selection of an external memory for installing the virtual printer service.

Next, in Step S502, the installer 402 installs the virtual printer service 211 into the host computer 101. The installation destination is a location that depends on the information on the installation destination acquired in Step S501 described above. The installed virtual printer service 211 is executed and activated by the OS 210. When the virtual printer service 211 is activated and there is no generated virtual printer, a main UI (FIG. 8A described later) of the virtual printer service 211 is displayed. This main UI can also be displayed by a user operation. When the main UI (FIG. 8A described later) of the virtual printer service 211 is displayed, the virtual printer service 211 starts processing of generating a virtual printer illustrated in FIG. 7.

Figure 7:
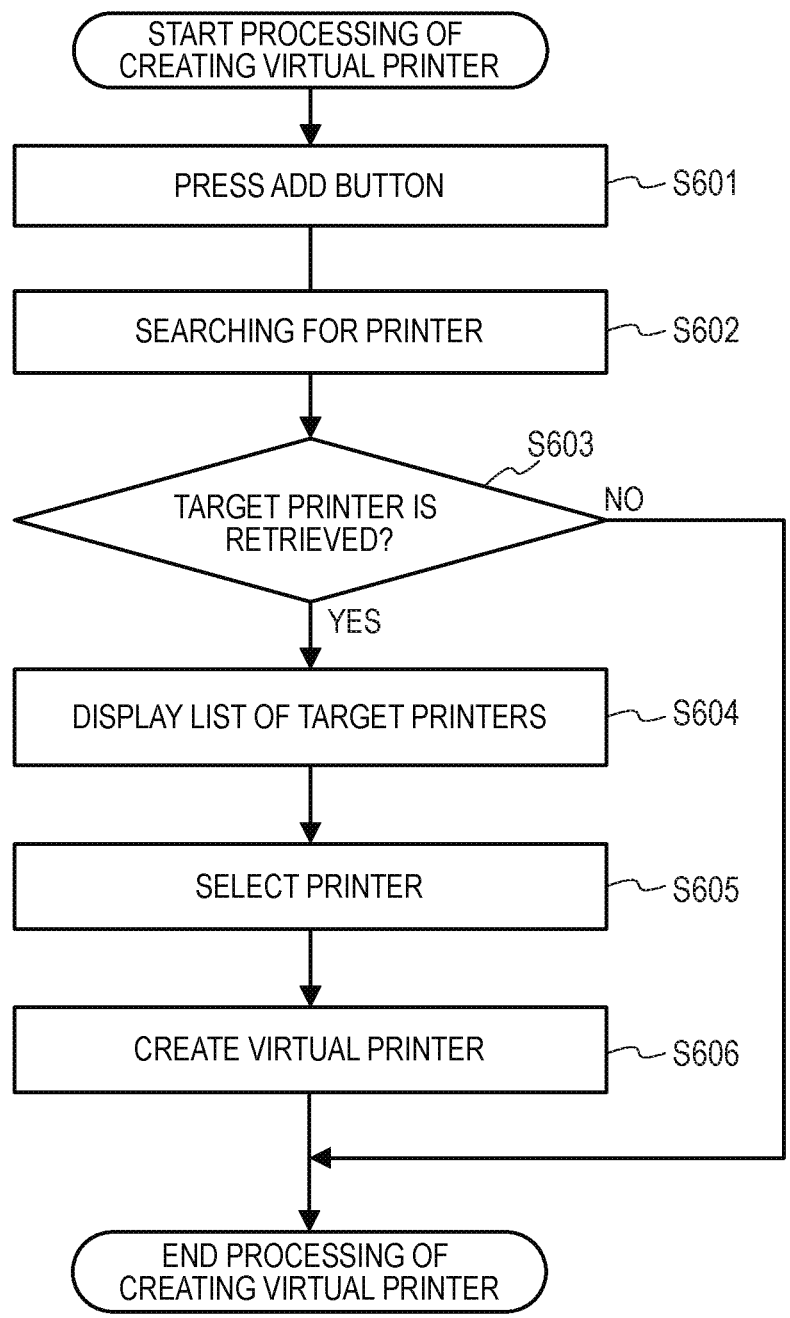
FIG. 7 is a flow chart for illustrating an example of processing of generating the virtual printer.

FIG. 7 is a flow chart for illustrating an example of the processing of generating the virtual printer. The processing of this flow chart is executed by the virtual printer service 211.

In Step S601, when the user has pressed an add button on the main UI, the virtual printer service 211 detects this operation. The add button is a "+" (plus) button 1004 of FIG. 8A described later. The virtual printer service 211, which has detected that the "+" button 1004 is pressed, displays a screen for adding a virtual printer illustrated in FIG. 8B described later, and advances the processing to Step S602. Now, the UI of the virtual printer service 211 is described with reference to FIG. 8A and FIG. 8B.

Figure 8A:
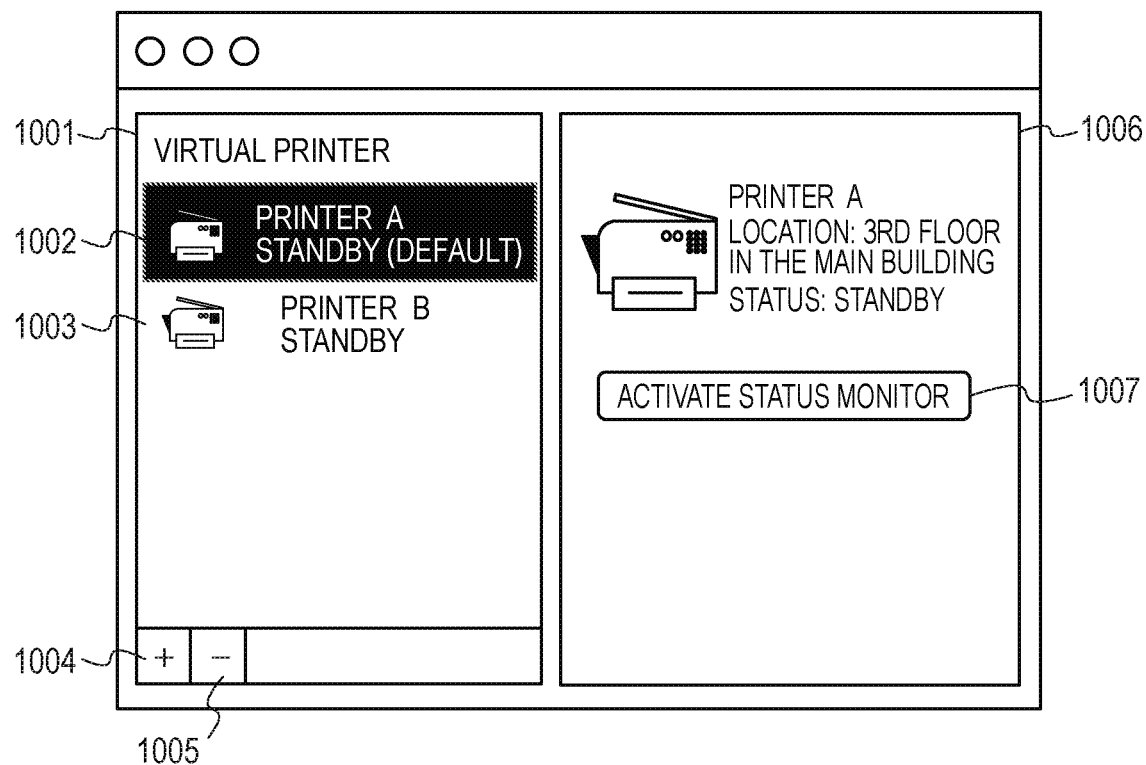
FIG. 8A is a diagram for illustrating an example of a main UI of the virtual printer service.
Figure 8B:
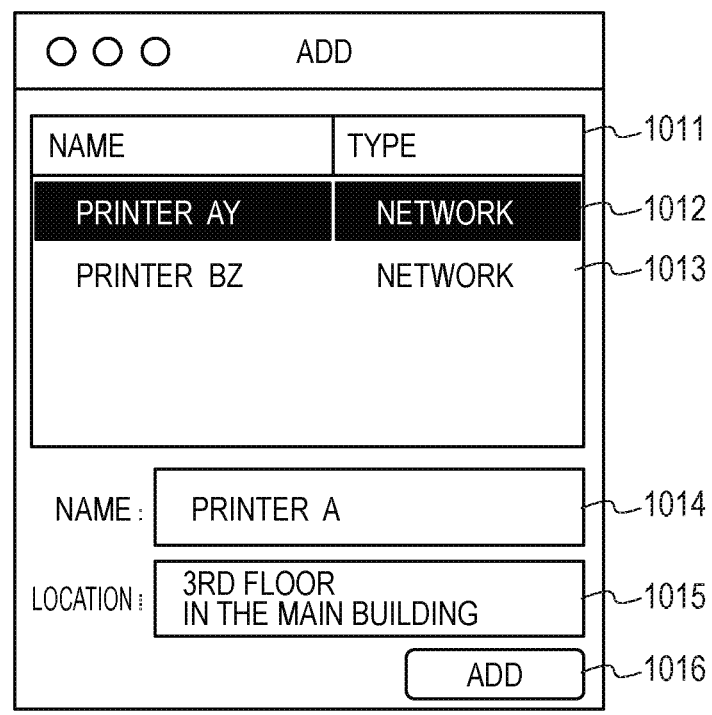
FIG. 8B is a diagram for illustrating an example of a UI for adding the virtual printer.

FIG. 8A and FIG. 8B are diagrams for illustrating examples of the UI of the virtual printer service 211. The UI of the virtual printer service 211 is displayed on the display 207 of the host computer 101 on which the virtual printer service 211 is activated.

FIG. 8A is an illustration of an example of the main UI of the virtual printer service.

In FIG. 8A, a list of virtual printers created by the server 302 is displayed on a printer list region 1001. The example of FIG. 8A shows a UI in a state in which two virtual printers (printer A and printer B) are already registered.

The icon, name, and status of the virtual printer A 311 are displayed on a region 1002. Similarly, the icon, name, and status of the virtual printer B 312 are displayed on a region 1003. The virtual printer service 211 immediately after being installed has generated no virtual printer, and thus no virtual printer is displayed on the list of virtual printers of the region 1001.

The user can press the "+" (plus) button 1004 to add a virtual printer. A UI in the case of pressing the "+" (plus) button 1004 is described later with reference to FIG. 8B. Further, a "−" (minus) button 1005 can be pressed to delete a virtual printer selected on the printer list region 1001.

Further, more detailed information on the virtual printer selected on the printer list region 1001 is displayed on a region 1006. Specifically, for example, an icon representing a printer, and the name, location, and status of the printer are displayed. Further, an "activate status monitor" button 1007 can also be pressed to display the state of the printer AY 103 more in detail.

FIG. 8B is an illustration of an example of the UI (virtual printer addition screen) to be displayed when the "+" button 1004 illustrated in FIG. 8A is pressed. A region 1011 of FIG. 8B displays a list of printers that are supported by the virtual printer service 211 among printers existing in or connected through USB to a network to which the host computer 101 is connected. In this example, the printer AY 103 and the printer BZ 104 connected to the network 100 are displayed on a region 1012 and a region 1013, respectively. The user selects, on this list, a printer for which a virtual printer is to be created, inputs a name 1014 and a location 1015, and presses an add button 1016. With this, the UI returns to FIG. 8A, and the virtual printer name (the name input on the name 1014) of the added virtual printer is added to and displayed on the printer list region 1001.

Now, the description returns to the flow chart of FIG. 7.

Figure 14:
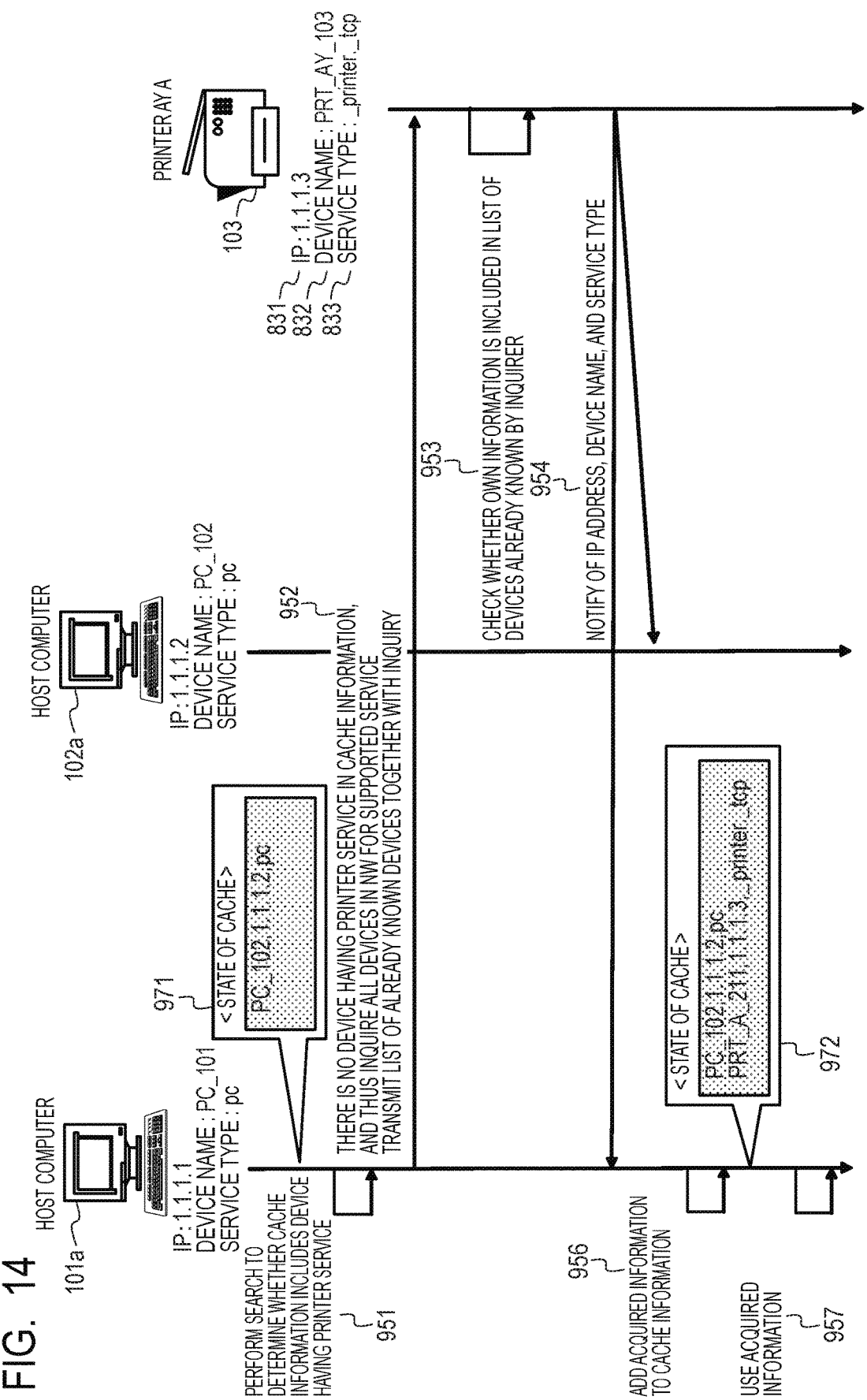
FIG. 14 is a sequence diagram for illustrating the search processing for a device on the network.

The virtual printer service 211, which has displayed the screen (FIG. 8B) for adding a virtual printer, executes processing of searching for a printer in Step S602. The processing of searching for a printer is implemented by executing processing as illustrated in FIG. 14 described later.

Next, in Step S603, the virtual printer service 211 determines whether the printers retrieved in Step S602 described above include a target printer of the virtual printer service 211. Determination of whether a relevant printer is the target printer uses a list of target printers of the virtual printer service held in the virtual printer service 211. When a printer retrieved in Step S602 described above is included in the list, the virtual printer service 211 determines this printer as the target printer.

Table 1 represents an example of information on the list of target printers of the virtual printer service.

TABLE 1

|  | Printer name |
|---|---|
| Target printer of virtual printer service | Printer AY<br>Printer BZ<br>Printer CX |

The list of target printers shows only the printer that is supported by the virtual printer service 211 among printers that do not support a printing system that enables printing without using a printer driver (that is, that do not support specific protocol). This list is held in the virtual printer service 211 before installation of the virtual printer service 211.

In Table 1, the printer name indicates the name of the printer.

Further, Table 2 represents an example of information on a list of printers retrieved in Step S602 described above.

TABLE 2

|  | Printer name | IP address | Service type |
|---|---|---|---|
| Retrieved printer | Printer AY<br>Printer BZ | 1.1.1.3<br>1.1.1.4 | _printer._tcp<br>_printer._tcp |

In Table 2, the printer name represents the name of the printer. The printer name is the name of a printer held in advance in the printer, and corresponds to a printer name returned by a printer to the host computer 101 when the printer is retrieved in Step S602 described above. The printer name is generally a name relating to a printer type, and this printer name is also used in Table 1.

Further, the IP address indicates an address of the printer on the network.

Further, the services type indicates a service that is supported by the printer. For example, when a device has the service type of "_printer._tcp", it is indicated that the device is a printer that supports the Line Printer Daemon (LPD) protocol.

The list of Table 2 shows all the printers retrieved in Step S602 described above.

The virtual printer service 211 compares the printers shown in Table 1 and Table 2 with one another, to thereby determine whether the retrieved printer is a target printer of the virtual printer service. In the example shown in Table 1 and Table 2, the printer AY and the printer BZ are determined to be the target printer. In this determination, there is illustrated an example of using a list (so-called "whitelist") of printers that do not support a specific protocol and that are supported by the virtual printer service 211. That is, there is illustrated a configuration of determining a retrieved printer as the target printer when the retrieved printer is included in this list. However, this determination may be performed by using a list (so-called "blacklist") of printers that support a specific protocol or that are not supported by the virtual printer service 211. In this case, there is adopted a configuration of determining a retrieved printer as the target printer when the retrieved printer is not included in this list. That is, there may be adopted a configuration of selecting a printer for which a virtual printer is to be generated by the virtual printer service 211 based on information on, for example, a list that can identify a printer that does not support a specific protocol or a printer that is supported by the virtual printer service 211.

In Step S603 described above, when the printers retrieved in Step S602 described above include no target printer of the virtual printer service (NO in Step S603), the virtual printer service 211 finishes the processing of this flow chart.

On the contrary, in Step S603 described above, when the printers retrieved in Step S602 described above include a target printer of the virtual printer service (YES in Step S603), the virtual printer service 211 advances the processing to Step S604.

In Step S604, the virtual printer service 211 displays the printer name of a printer determined to be a target printer in Step S603 described above on the region 1011 of the virtual printer addition screen (FIG. 8B). In the above-mentioned example, the printer names of the printer AY 103 and the printer BZ 104 connected to the network 100 are displayed on the region 1012 and the region 1013, respectively. That is, the virtual printer service 211 presents, to the user, a list of printers selected based on the above-mentioned list (e.g., list shown in Table 1) from among printers retrieved in Step S602 described above.

Next, in Step S605, the virtual printer service 211 executes processing of selecting a printer being a destination to which the virtual printer is to be connected. When the user has pressed the add button 1016 under a state in which any one of printers is selected on the region 1011 of FIG. 8B, the virtual printer service 211 detects this operation. Then, the virtual printer service 211 acquires, from the virtual printer addition screen (FIG. 8B), information on the printer name, the name 1014, and the location 1015 of the printer selected on the region 1011. In the example of FIG. 8B, "printer AY" is selected as the information on the printer name of the selected printer, "printer A" is selected as the information on the name, and "3rd floor in this building" is selected as the information on the location.

Next, in Step S606, the virtual printer service 211 executes processing of generating a virtual printer. This processing involves associating the printer selected in Step S605 described above as a connection destination, and generating a virtual printer based on the name and location acquired in Step S605 described above. The virtual printer generated in this processing has information to be notified by the printer, which is defined in the Bonjour protocol. This information includes, for example, a connection destination of the virtual printer, a name of the virtual printer, a function of the virtual printer, a service type of the virtual printer, and a printer name of the virtual printer to be notified by using the Bonjour protocol. The connection destination of the virtual printer corresponds to an IP address of the printer selected in Step S605 described above, for example. Specifically, the connection destination is an IP address (exemplified in Table 2) acquired at the time of search of Step S603 described above. Further, the function of the virtual printer corresponds to, for example, supporting a page description language (PDL) or other supporting functions. The function of this virtual printer is different for each printer selected in Step S605 described above, and is held in the virtual printer service 211 before installation of the virtual printer service. Further, the printer name of the virtual printer to be notified by using the Bonjour protocol described above is generated in the following manner.

Figure 9:
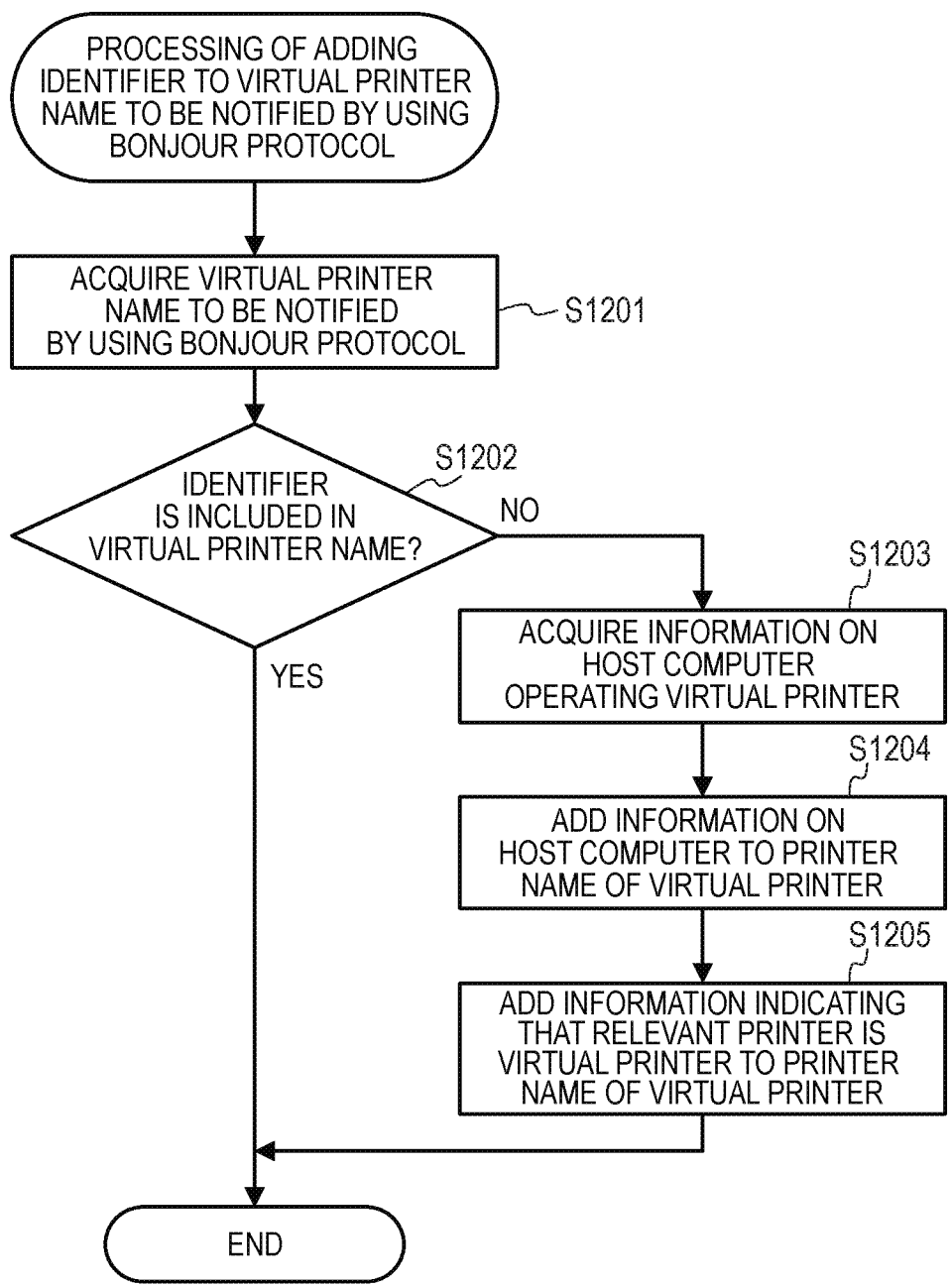
FIG. 9 is a flow chart for illustrating an example of identifier addition processing of adding an identifier to a printer name of the virtual printer.

The virtual printer service 211 first temporarily sets the printer name of the virtual printer to be notified by using the Bonjour protocol as the above-mentioned name of the virtual printer, and further executes identifier addition processing illustrated in FIG. 9. With this, the printer name of the virtual printer to be notified by using the Bonjour protocol is generated.

FIG. 9 is a flow chart for illustrating an example of the identifier addition processing to be executed in Step S606 of FIG. 7. This processing corresponds to processing of adding an identifier to the printer name of the virtual printer to be notified by using the Bonjour protocol. Now, description is made by using an example of adding an identifier to the printer name of the virtual printer A 311 to be notified by using the Bonjour protocol. However, the same holds true for other virtual printers.

In Step S1201, the virtual printer service 211 acquires, for the virtual printer (hereinafter referred to as "target virtual printer") generated in Step S606 of FIG. 7, the printer name of the virtual printer to be notified by using the Bonjour protocol. For example, when the target virtual printer is the virtual printer A 311, "virtual printer A" is acquired.

Next, in Step S1202, the virtual printer service 211 determines whether the printer name acquired in Step S1201 described above includes an identifier. The identifier includes information 1712 indicating that the relevant printer is a virtual printer, and information 1713 on a host computer operating the target virtual printer. The information on a host computer corresponds to information such as the computer name or login name, which can be acquired from the host computer.

In Step S1202 described above, when the printer name acquired in Step S1201 described above includes an identifier (YES in Step S1202), the virtual printer service 211 finishes the processing of this flow chart.

On the contrary, when the printer name acquired in Step S1201 described above does not include an identifier (NO in Step S1202), the virtual printer service 211 advances the processing to Step S1203.

In Step S1203, the virtual printer service 211 acquires information on a host computer operating the target virtual printer. When the target virtual printer is the virtual printer A 311, the virtual printer service 211 acquires information on the host computer 101a. The information acquired in this case is information that can identify the host computer 101a, such as the computer name or login name of the host computer. The information may be information other than the computer name or login name as long as the information can identify the host computer.

Next, in Step S1204, the virtual printer service 211 adds, to the printer name acquired in Step S1201 described above, information on the host computer acquired in Step S1203 described above. The processing of Step S1203 and Step S1204 may be performed in order of Step S1204 and Step S1203.

Further, in Step S1205, the virtual printer service 211 adds information indicating that the relevant printer is a virtual printer to the printer name to which the information on the host computer name is added in Step S1204 described above. The information indicating that the relevant printer is a virtual printer is a character string of "virtual", for example.

FIG. 10 is a diagram for illustrating an example of the printer name of the virtual printer to be notified by using the Bonjour protocol, to which the identifier is added through the processing of from Step S1203 to Step S1205 of FIG. 9.

Printer names 1701 to 1704 of the virtual printer to be notified by using the Bonjour protocol are printer names obtained by adding an identifier to a printer name 1711 of the virtual printer created in Step S606 of FIG. 7. The identifier includes the information 1712 indicating that the relevant printer is a virtual printer, and information 1713 on a host computer operating the virtual printer. The order of the pieces of information 1711, 1712, and 1713 are not limited thereto. Further, only one of the pieces of information 1712 and 1713 may be added to the information 1711 as the identifier.

In the first embodiment, a character string of "virtual" is used for the information 1712 indicating that the relevant printer is a virtual printer, and a user name is used for the information 1713 on the host computer. However, those pieces of information may be other types of information as long as those pieces of information enable identification of a virtual printer and a host computer.

The printer name to which an identifier is added through the above-mentioned identifier addition processing is the printer name of a virtual printer to be notified by using the Bonjour protocol. That is, an identifier is not added to printer names (1002 and 1003) displayed on the main UI of the virtual printer service illustrated in FIG. 8A. For example, a specific case in which the host computer 101a logged in by the user A has generated the virtual printer A 311 is considered. In this case, the printer name of the virtual printer displayed on the region 1002 of FIG. 8A is "printer A", and the printer name of the virtual printer to be notified by using the Bonjour protocol is "printer A_virtual_user A".

Through the above-mentioned processing, it is possible to generate a virtual printer with its printer name to be notified by using the Bonjour protocol being a printer name including an identifier formed of information on a host computer and information indicating that the relevant printer is a virtual printer.

In order to execute printing by using the generated virtual printer, the OS 210 is used to register the virtual printer as a service program. The virtual printer registered in the OS 210 as a service program is constantly operating during execution of the OS 210, and responds to an inquiry from other programs or information devices. A sequence indicating the device search processing illustrated in FIG. 15 described later is one example. With this, the virtual printer seems as if the virtual printer were existing as an actual printer from the viewpoint of other programs or information devices.

Now, processing of registering the virtual printer in the OS is described.

Figure 11:
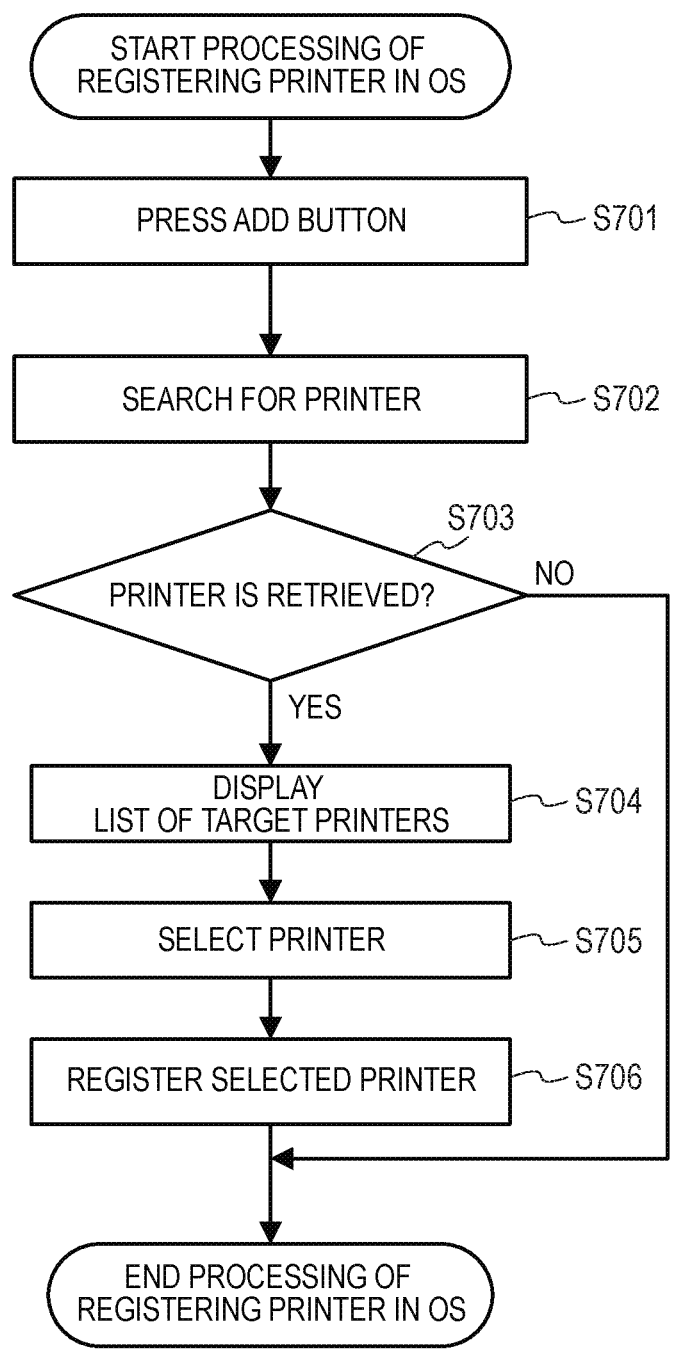
FIG. 11 is a flow chart for illustrating an example of processing for printer registration in an OS.

FIG. 11 is a flow chart for illustrating an example of the printer registration processing to be executed by the OS 210. The processing of this flow chart is started when the main UI (FIG. 12A) for registering a printer that executes printing in the OS 210 is displayed through a user operation.

In Step S701, when the user has pressed the add button, the printing system 301 of the OS 210 detects this operation. This add button is a "+" (plus) button 1104 in FIG. 12A described later. When the printing system 301 of the OS 210 has detected that the "+" button 1104 is pressed, the printing system 301 of the OS 210 displays a screen for registering a printer illustrated in FIG. 12B, and advances the processing to Step S702. Now, the UI for registering a printer that executes printing in the OS 210 is described with reference to FIG. 12A and FIG. 12B.

Figure 12A:
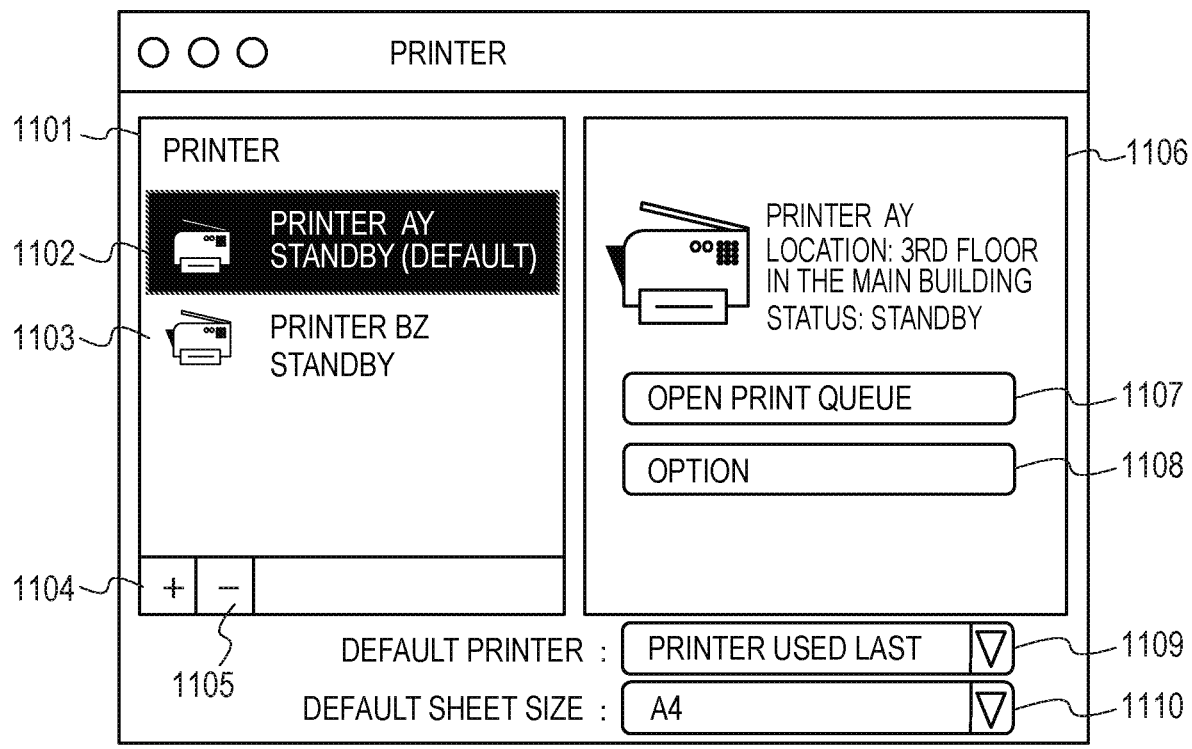
FIG. 12A is a diagram for illustrating an example of a main UI for registering a printer that executes printing in the OS.
Figure 12B:
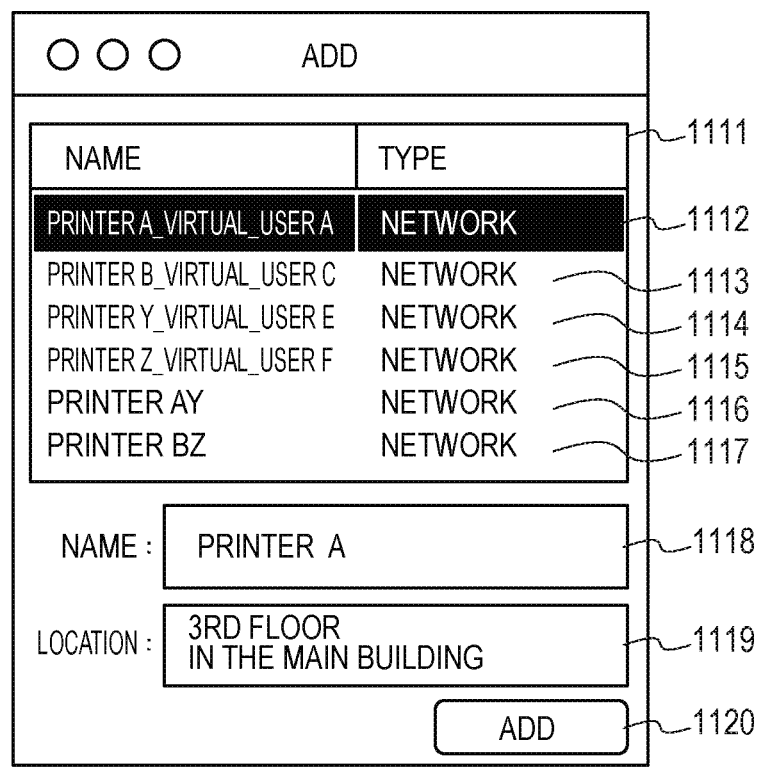
FIG. 12B is a diagram for illustrating an example of a UI for adding a printer that executes printing in the OS.

FIG. 12A and FIG. 12B are diagrams for illustrating an example of the UI for registering a printer that executes printing in the OS 210. The UI for registering a printer that executes printing in the OS 210 is displayed on the display 207 of the host computer 101 operating the OS 210.

FIG. 12A is an illustration of the main UI for registering a printer that executes printing in the OS 210.

A printer list region 1101 of FIG. 12A displays a list of printers already registered in the OS 210 as a printer that executes printing. The example of FIG. 12A is an illustration of a UI in a state in which two printers (printer AY and printer BZ) are already registered.

The icon, name, and status of the virtual printer AY are displayed on a region 1102. Similarly, the icon, name, and status of the virtual printer BZ are displayed on a region 1103.

The user can press the "+" (plus) button 1104 to add a printer. A UI in the case of pressing the "+" (plus) button 1104 is described later with reference to FIG. 12B. Further, a "−" (minus) button 1105 can be pressed to delete a printer selected on the printer list region 1101.

Further, more detailed information on the printer selected on the printer list region 1101 is displayed on a region 1106. Specifically, for example, an icon representing a printer, and the name, location, and status of the printer are displayed. Further, an "open print queue" button 1107 can also be pressed to display more in detail the state of the printer selected on the region 1101. Further, an "option" button 1108 can be pressed to change settings of options (not shown) of the printer selected on the region 1101, or to display, for example, a screen displaying the remaining amount of a printing agent, such as toner or ink.

FIG. 12B is an illustration of an example of the UI (printer addition screen) to be displayed when the "+" button 1104 of FIG. 12A is pressed. On a region 1111 of FIG. 12B, a list of an actual printer on the connected network, an actual printer connected through USB to the network, and a virtual printer is displayed, and presented to the user. The user can select a printer to be registered from the list on the region 1111, and input a name 1118 and a location 1119. Then, an add button 1120 is pressed last, and thus the UI returns to FIG. 12A, and the registered printer is added to the printer list region 1101 and displayed.

Now, the description returns to FIG. 11.

Figure 15:
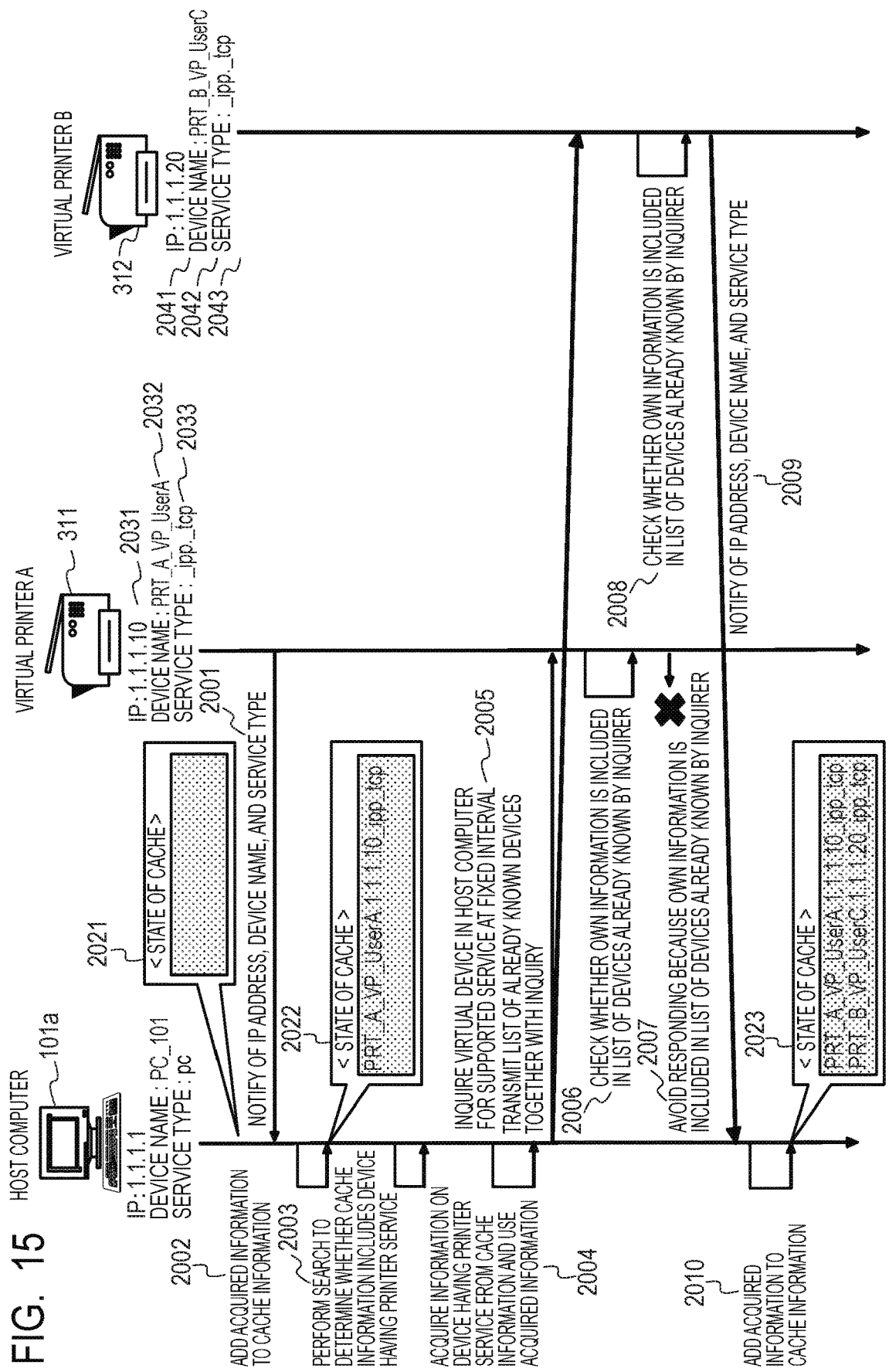
FIG. 15 is a sequence diagram for illustrating search processing for a virtual printer in the host computer.

In Step S702, the printing system 301 of the OS 210, which has displayed the screen for registering a printer of FIG. 12B, executes processing of searching for a printer. The search processing is implemented by executing such processing as illustrated in FIG. 14 and FIG. 15 described later. For example, the OS 210 transmits a search request using the Bonjour protocol to the network 100, and receives a response to the search request from a device on the network 100, to thereby execute the search processing.

Next, in Step S703, the printing system of the OS determines whether a printer is retrieved in Step S702 described above.

Further, Table 3 represents an example of information on a list of printers retrieved in Step S703 described above.

TABLE 3

| | Pinter name | IP address | Service type |
|---|---|---|---|
| Retrieved printer | Printer A_virtual_user A | 1.1.1.10 | _ipp._tcp |
| | Printer B_virtual_user C | 1.1.1.20 | _ipp._tcp |
| | Printer Y_virtual_user E | 1.1.1.30 | _ipp._tcp |
| | Printer Z_virtual_user F | 1.1.1.40 | _ipp._tcp |
| | Printer AY | 1.1.1.3 | _printer._tcp |
| | Printer BZ | 1.1.1.4 | _printer._tcp |

In Table 3, the printer name indicates the name of the printer, and corresponds to a printer name to be notified by using the Bonjour protocol from that printer.

The IP address indicates an address of the printer on the network.

The services type indicates a service that is supported by the printer. For example, when a device has the service type of "_printer._tcp", it is indicated that the device is a printer that supports an LPD protocol. Further, it is indicated that a device having the service type of "_ipp._tcp" is a printer that supports an internet printing protocol (IPP).

A device having the service type of "_printer._tcp" or "_ipp._tcp" is determined to be a printer. Printers shown in Table 3 and satisfying the condition are "printer A_virtual_user A", "printer B_virtual_user C", "printer Y_virtual_user E", "printer_Z_virtual_user F", "printer AY", and "printer BZ".

In Step S703 described above, when no printer is retrieved in Step S702 described above (NO in Step S703), the printing system of the OS ends the processing of this flow chart.

On the contrary, in Step S703 described above, when a printer is retrieved in Step S702 described above (YES in Step S703), the printing system of the OS advances the processing to Step S704.

In Step S704, the printing system of the OS displays, as a printer, a list of devices determined to be a printer in Step S703 described above on the region 1111 of FIG. 12B. Thus, a list of an actual printer on the connected network, an actual printer connected through USB to the network, and a virtual printer is displayed on the region 1111. That is, the listed virtual printers include not only a virtual printer created in the host computer, but also a virtual printer created in another host computer, which is on the connected network. In the example of FIG. 12B, the printer names of the actual printers AY and BZ connected to the network are displayed on a region 1116 and a region 1117, respectively. Further, the printer names of the virtual printers A and B created in the host computer (101a in this case) displaying this UI are displayed on a region 1112 and a region 1113, respectively. Further, the printer names of the virtual printers Y and Z created in another host computer (101b in this case) on the network 100 are also displayed on a region 1114 and a region 1115, respectively. Only the printer supported by the printing system of the OS 210 (supporting specific protocol) may be displayed on the region 1111 of FIG. 12B.

The printer name to be displayed on the region 1111 of FIG. 12B is a printer name to be notified by using the Bonjour protocol from that printer. Thus, in the case of a virtual printer in the first embodiment, a printer name of the virtual printer to which the above-mentioned identifier is added is displayed. For example, the virtual printer A 311 is displayed by "printer A_virtual_user A", and the virtual printer B 312 is displayed by "printer B_virtual_user C". Further, the printer names of retrieved printers, that is, the printer names of the virtual printer Y361 and the virtual printer Z362 are displayed by "printer Y_virtual_user E" and "printer Z_virtual_user F", respectively.

Next, in Step S705, the printing system 301 of the OS 210 executes processing of selecting a printer to be registered in the OS 210. When the user has pressed the add button 1120 under a state in which a printer is selected on the region 1111 of FIG. 12B, the printing system 301 of the OS 210 detects this operation. Then, the printing system 301 acquires, from the printer registration screen (FIG. 12B), information on the printer name, the name 1118, and the location 1119 of the selected printer. In the example of FIG. 12B, "printer A_virtual_user A" is selected as the information on the printer name of the selected printer, "printer A" is selected as the information on the name, and "3rd floor in the main building" is selected as the information on the location. When the user selects a printer from the list of the region 1111, the user is to distinguish between a virtual printer created in the own host computer and a virtual printer created in another host computer. In the first embodiment, as described above, a list of printer names to which an identifier is added is displayed, and thus the user can easily select a virtual printer created in the host computer.

Next, in Step S706, the printing system 301 of the OS 210 registers a printer in the OS 210. This processing involves registering the printer selected in Step S705 described above in the OS 210. The connection destination information is set to be an IP address (exemplified in Table 3) acquired at the time of search of Step S703 described above, and the printer is registered in the OS 210 based on the information on the name and location of the printer acquired similarly in Step S705 described above.

The connection destination IP address, name, and location of the registered printer are stored in the external memory 209 of the host computer 101. Then, the UI returns to FIG. 12A, and the registered printer is added to the printer list region 1101 and displayed. After that, the registered printer can be selected as a transmission destination of a print job on a printing settings screen (not shown) of the OS 210, which is opened in the application 212, and printing using a specific protocol can be executed.

Through the above-mentioned configuration, the user can easily distinguish between a virtual printer created in the host computer, which executes processing of registering a printer in the OS, and a virtual printer created in another host computer. As a result, the user can easily select a virtual printer created in the host computer, which executes processing of registering a printer in the OS, and register the virtual printer in the OS. Further, it is possible to prevent a virtual printer created in another host computer from being registered in the OS.

When the identifier as in the first embodiment is not added, the region 1111 of the printer addition screen displays, for example, a list of the printer A, the printer B, the printer Y, the printer Z, the printer AY, and the printer BZ. In this case, the user has a difficulty in determining which printer is an actual printer, a virtual printer created in the own apparatus, or a virtual printer created in another apparatus. As a result, a virtual printer created in another host computer is more likely to be registered in the OS. In a case where a virtual printer created in another host computer is registered in the OS, even when the registered virtual printer is selected for printing, printing cannot be executed under a state in which the another host computer is not activated. In the first embodiment, it is possible to suppress occurrence of such a phenomenon, and the user can easily select a virtual printer created in the information processing apparatus of the user through the printing system of the OS, and register the virtual printer in the OS. As a result, it is possible to prevent a virtual printer created in another information processing apparatus from being registered in the OS.

Now, a sequence of the search processing for a device on the network is described.

Figure 13:
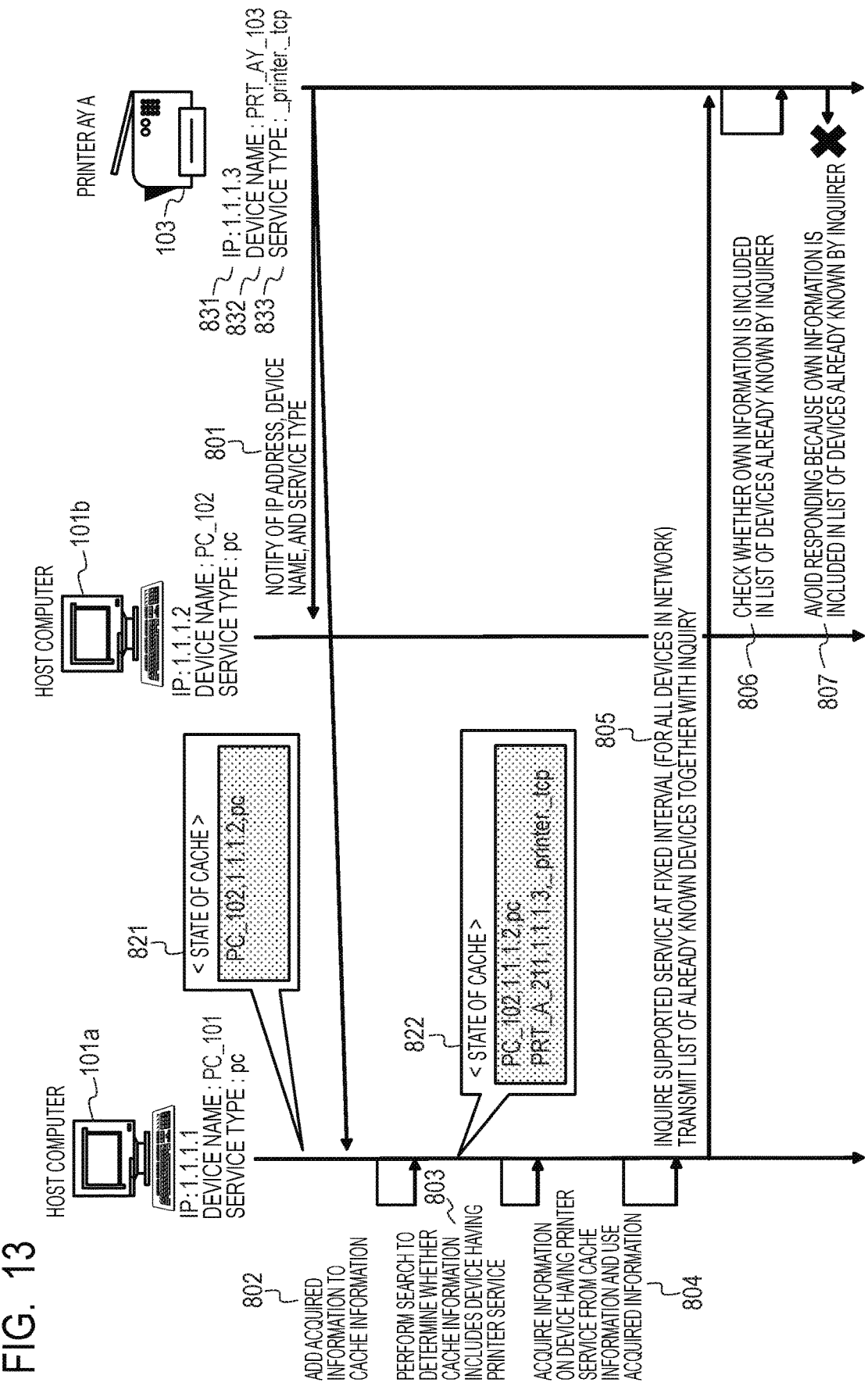
FIG. 13 is a sequence diagram for illustrating search processing for a device on a network.

FIG. 13 is a sequence diagram in a case where the printer AY 103 notifies of its existence in the search processing for a device on the network.

When the printer AY 103 joins the network, the printer AY 103 uses the technology of Multicast DNS to notify devices on the same network of an IP address 831, a device name 832, and a service type 833 of the printer AY 103 (801). That is, the printer AY 103 notifies of printer information in accordance with the Bonjour protocol. The service type is a value indicating a service supported by the device in the Bonjour protocol. An example of the service type indicating a printer is shown in Table 4.

TABLE 4

| Service type |
| --- |
| _printer._tcp |
| _pdl-datastream._tcp |
| _ipps._tcp |
| _ipp._tcp |

The host computer 101a, which has received the notification from the printer AY 103, adds the IP address 831, the device name 832, and the service type 833 of the printer AY 103 to cache information 821 (802). The cache information is information to be used by a system for reducing a load on the network in the Bonjour protocol. An example of information included in this cache information is shown in Table 5.

TABLE 5

|  | IP address | Device name | Service type |
|---|---|---|---|
| Cache information | 1.1.1.2 | PC_102 | pc |
|  | 1.1.1.3 | PRT_AY | _printer._tcp |
|  | . | . | . |
|  | . | . | . |
|  | . | . | . |

After that, when the host computer 101a searches for a device on the network, the host computer 101a first searches for a device having a service type described in Table 4 from cache information 822 (803). When information on the printer AY 103 is included in the cache information, information on the printer AY 103 included in the cache information is used for subsequent processing (804).

Further, the host computer 101a uses the technology of Multicast DNS to transmit an inquiry for the supported service to a device on the same network at a fixed interval (805). That is, is, a device search request based on the Bonjour protocol is transmitted. The host computer 101a notifies the device on the same network of a list (list based on cache information 822) of devices already known by the host computer 101a together with the inquiry.

The printer AY 103, which has received the inquiry from the host computer 101a, checks whether the printer AY 103 is included in the list 822 of devices already known by the host computer 101a (806). In this example, the printer AY 103 determines that the printer AY 103 is included in the list 822 of devices already known by the host computer 101a, and does not respond to the inquiry transmitted by the host computer 101a (807).

FIG. 14 is a sequence diagram in a case where the printer AY 103 notifies of the IP address 831, the device name 832, and the service type 833 in response to a search from the host computer 101a in the search processing for a device on the network.

The host computer 101a searches for a device having a service type described in Table 4 from cache information 971 (951). When there is no corresponding device in the cache information 971, the host computer 101a uses the technology of Multicast DNS to transmit an inquiry for the supported service to a device on the same network (952). That is, a device search request based on the Bonjour protocol is transmitted. Even when there is a corresponding device, the host computer 101a transmits an inquiry for the supported service to the device on the same network at a fixed interval, which is shown in 805 of FIG. 13 described above. The host computer 101a notifies the device on the same network of the list 971 of devices already known by the host computer 101a together with the inquiry.

The printer AY 103 checks whether the printer AY 103 is included in the list (list based on cache information 971) of devices already known by the host computer 101a (953). In this example, the printer AY 103 determines that the printer AY 103 is not included in the list 971 of devices already known by the host computer 101a. Then, the printer AY 103 uses the technology of Multicast DNS to notify a device on the same network of the IP address 831, the device name 832, and the service type 833 of the printer AY 103 (954). That is, printer information is returned in accordance with the Bonjour protocol.

Then, the host computer 101a adds the IP address 831, the device name 832, and the service type 833 of the printer AY 103 to the cache information 971 (956).

The host computer 101a uses the information received from the printer AY 103 for subsequent processing (957).

FIG. 15 is a sequence diagram for illustrating processing of searching for a virtual printer created in the host computer.

The virtual printer A 311 and the virtual printer B 312 are created in the host computer 101a. In this case, the virtual printer A 311 transmits a notification of its existence from the virtual printer A 311. Further, an example in which the virtual printer B 312 transmits a notification of its existence in response to a search from the host computer 101a is described.

The virtual printer A 311 uses the technology of Multicast DNS to notify host computer 101a of an IP address 2031, a device name 2032, and a service type 2033 of the virtual printer A 311 (2001). That is, the virtual printer A 311 notifies of printer information in accordance with the Bonjour protocol. At this time, the virtual printer A 311 in the first embodiment notifies of, as the device name 2032, "VP", which is an abbreviation for a virtual printer, as information indicating that the relevant printer is a virtual printer and information to which "User A" is added as information on the host computer. In this example, an example of using a character string of "VP" as the information indicating that the relevant printer is a virtual printer is described. However, a character sting of "virtual" may be used as described above.

The host computer 101a, which has received the notification from the virtual printer A 311, adds the IP address 2031, the device name 2032, and the service type 2033 of the virtual printer A 311 to cache information (2021) (2002).

After that, when the host computer 101a searches for a virtual printer in the host computer 101a, the host computer 101a first searches for a device having a service type described in Table 4 from cache information 2022 (2003). When information on the virtual printer A 311 is included in the cache information, information on the virtual printer A 311 included in the cache information is used for subsequent processing (2004).

Further, the host computer 101a uses the technology of Multicast DNS to transmit an inquiry for the supported service to a virtual printer in the host computer 101a at a fixed interval (2005). That is, a device search request based on the Bonjour protocol is transmitted. The host computer 101a notifies the virtual printer in the host computer 101a of a list (list based on cache information 2022) of devices already known by the host computer 101a together with the inquiry.

The virtual printer A 311, which has received the inquiry from the host computer 101a, checks whether the virtual printer A 311 is included in the list 2022 of devices already known by the host computer 101a (2006). The virtual printer A 311 determines that the virtual printer A 311 is included in the list 2022 of devices already known by the host computer 101a, and does not respond to the inquiry transmitted by the host computer 101a (807).

The virtual printer B 312, which has received the inquiry from the host computer 101a, checks whether the virtual printer B 312 is included in the list 2022 of devices already known by the host computer 101a (2008). In this example, the virtual printer B 312 determines that the virtual printer B 312 is not included in the list 2022 of devices already known by the host computer 101a. Then, the virtual printer B 312 uses the technology of Multicast DNS to notify the host computer 101a of an IP address 2041, a device name 2042, and a service type 2043 of the virtual printer B 312 (2009). That is, printer information is returned in accordance with the Bonjour protocol. At this time, the virtual printer B 312 in the first embodiment notifies of, as the device name 2042, "VP" as information indicating that the relevant printer is a virtual printer and information to which "User C" is added as information on the host computer.

The host computer 101a adds the IP address 2041, the device name 2042, and the service type 2043 of the virtual printer B 312 to the cache information 2022 (2010).

Figure 16:
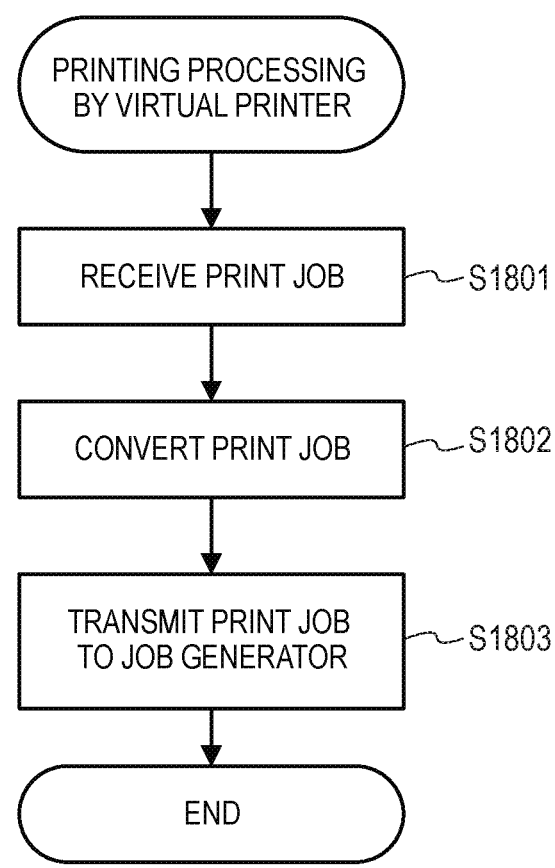
FIG. 16 is a flow chart for illustrating an example of processing to be executed by the virtual printer at a time of execution of printing.

FIG. 16 is a flow chart for illustrating an example of processing to be executed at the time of execution of printing by the virtual printer.

In Step S1801, when the virtual printer (e.g., virtual printer A 311) has received a print job from the printing system 301 in the OS 210, the virtual printer advances the processing to Step S1802.

In Step S1802, the virtual printer converts the print job received in Step S1801 described above into a format that can be recognized by the job generator 303. In this case, the format that can be recognized by the job generator 303 is, for example, a PDF format.

Next, in Step S1803, the virtual printer transmits the print job converted in Step S1802 described above to the job generator 303, and ends the processing of this flow chart.

Figure 17:
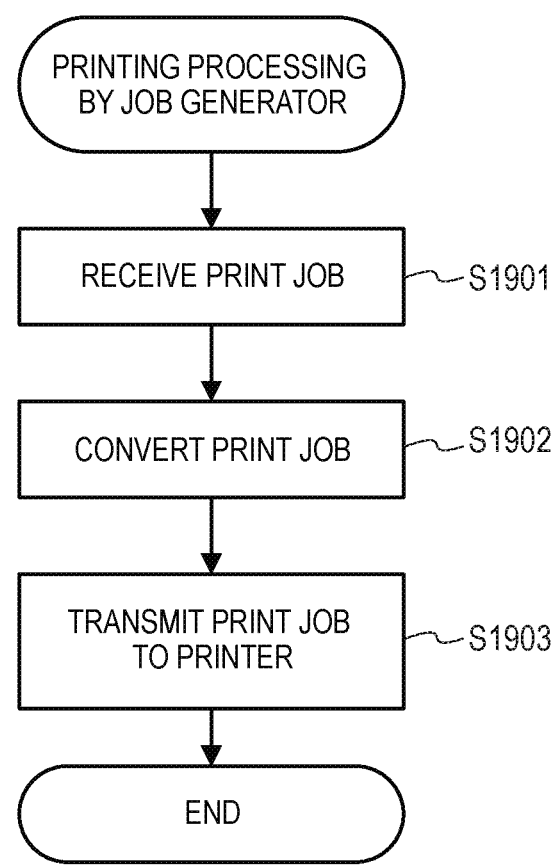
FIG. 17 is a flow chart for illustrating an example of processing to be executed by a job generator at the time of execution of printing.

FIG. 17 is a flow chart for illustrating an example of processing to be executed at the time of execution of printing by the job generator 303.

In Step S1901, when the job generator 303 in the virtual printer service 211 has received a print job from a virtual printer (e.g., virtual printer A 311), the job generator 303 advances the processing to Step S1902.

In Step S1902, the job generator 303 converts the print job received in Step S1901 described above into a format that can be recognized (interpreted) by an actual printer (e.g., printer AY 103) with which the virtual printer being a transmission source of the above-mentioned print job is associated. In this case, the format that can be recognized by an actual printer is, for example, a raster format.

Next, in Step S1903, the job generator 303 transmits the print job converted in Step S1902 described above to the actual printer with which the virtual printer being a transmission source of the above-mentioned print job is associated, and ends the processing of this flow chart.

In the first embodiment, the configuration of executing the identifier addition processing of FIG. 9 at the time of generation of a virtual printer, that is, in Step S606 of FIG. 7 has been described. In the case of this configuration, when a virtual printer is generated, the virtual printer holds a printer name to which an identifier is added as the printer name of the virtual printer to be notified by using the Bonjour protocol. However, aspects of the disclosure included in the first embodiment are not limited to this configuration. There may be adopted a configuration of executing the identifier addition processing of FIG. 9 and adding an identifier to a printer name of a virtual printer at a time of, for example, notifying of (returning) the printer name by using the Bonjour protocol, and notifying of (returning) the printer name of the virtual printer to which the identifier is added. That is, the identifier addition processing of FIG. 9 may be executed to add an identifier to a printer name and give a notification at a time of, for example, notification (notification of its existence) of 2001 of FIG. 15 or notification (response to inquiry from host computer 101) of 2009 of FIG. 15.

As described above, through use of the virtual printer in the first embodiment, it is possible to transmit a print job to an image forming apparatus that does not support a specific protocol from a printing system that enables printing without using a printer driver by using the specific protocol. Regarding the virtual printer in the first embodiment, it is possible to easily distinguish between a virtual printer created in a host computer that executes the processing of registering a printer in the OS and a virtual printer created in another host computer. Thus, the user can easily select a virtual printer created in a host computer that executes the processing of registering a printer in the OS, and register the virtual printer in the OS. Further, it is possible to prevent a virtual printer created in another computer from erroneously being registered in the OS. As a result, it is possible to suppress occurrence of such a phenomenon that when a virtual printer created in another host computer is selected for printing, printing cannot be executed because another host computer is not activated.

Second Embodiment

In the first embodiment, description has been made of the configuration of notifying of, as the printer name of a virtual printer to be notified by using the Bonjour protocol, a printer name to which an identifier including information indicating that the relevant printer is a virtual printer and information on a host computer is added. A second embodiment of the disclosure adopts a configuration in which an access range of a virtual printer is set, and another host computer is not notified of the printer name of the virtual printer by using the Bonjour protocol. As a result, a host computer other than a host computer operating a virtual printer cannot find the virtual printer. Thus, it is possible to prevent the user from erroneously registering a virtual printer created in another host computer in the OS. With this, it is possible to prevent such a phenomenon that when a virtual printer created in another computer is selected for printing, printing cannot be executed because another host computer is not activated. Now, a configuration of the second embodiment is described in detail. In the second embodiment, the identifier addition processing of FIG. 9 is not executed as in the first embodiment, and a virtual printer notifies of (returns) a printer name to which the above-mentioned identifier is not added.

Figure 18:
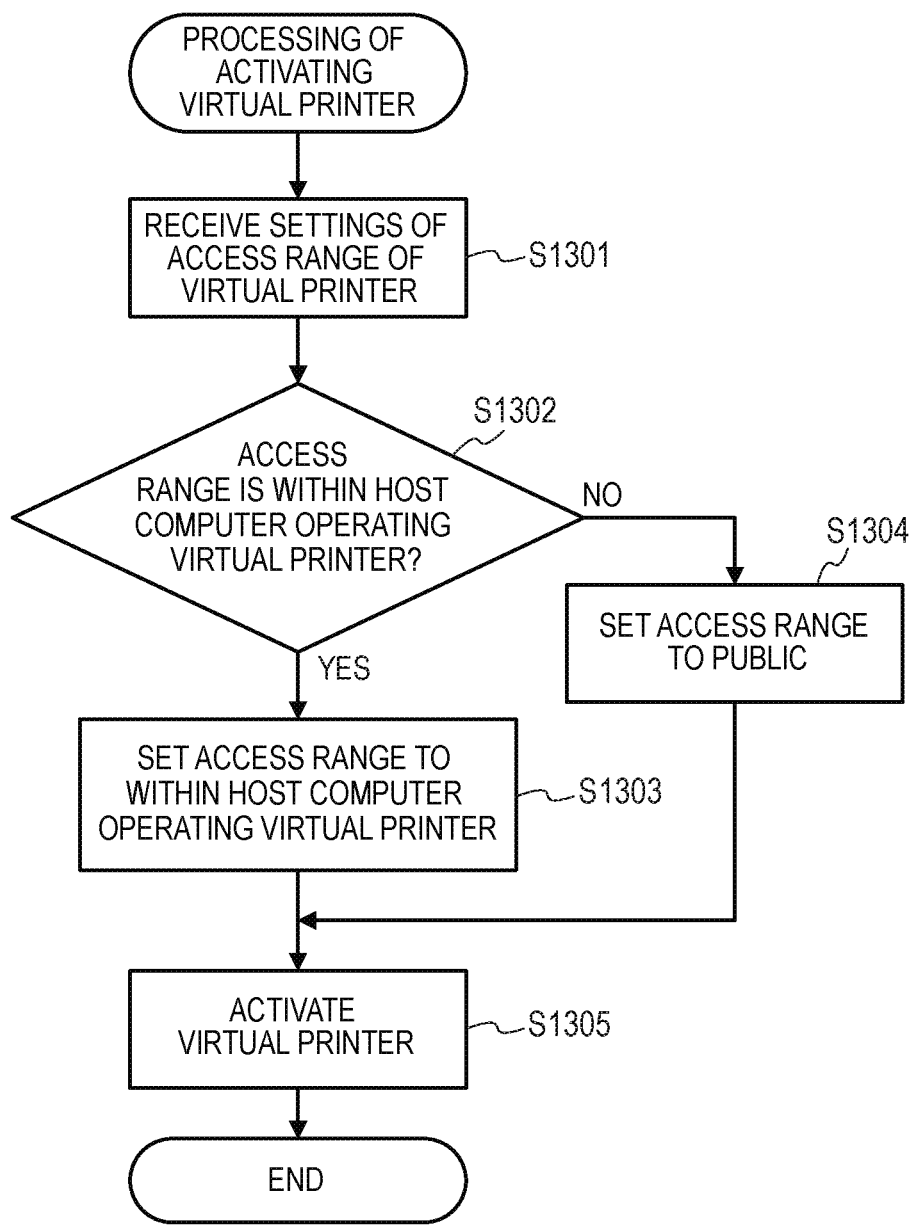
FIG. 18 is a flow chart for illustrating an example of processing to be executed at the time of starting a virtual printer in a second embodiment of the disclosure.

FIG. 18 is a flow chart for illustrating an example of processing to be executed at the time of activation of a virtual printer in the second embodiment. This processing is executed when the virtual printer service 211 activates a virtual printer. When the virtual printer service 211 is activated, the virtual printer service 211 activates a virtual printer generated in the virtual printer service 211. Further, when the virtual printer is generated, the virtual printer service 211 activates the generated virtual printer.

In Step S1301, the virtual printer service 211 receives settings of an access range of a virtual printer to be activated. The virtual printer service 211 displays a screen (not shown) for setting the access range of the virtual printer on the display 207 of the host computer 101 operating the virtual printer service 211, and receives settings of the range of access from the user. Reception of the settings of the access range is performed by selecting "within host computer operating virtual printer" or "public", for example. When the virtual printer service 211 has received the settings of the access range from the user, the virtual printer service 211 advances the processing to Step S1302.

In Step S1302, the virtual printer service 211 determines the access range of the virtual printer whose settings are input in Step S1301 described above. When the access range is "within host computer operating virtual printer" (YES in Step S1302), the virtual printer service 211 advances the processing to Step S1303.

In Step S1303, the virtual printer service 211 sets the access range of the virtual printer to be activated to "within host computer operating virtual printer", and activates the virtual printer in Step S1305.

On the contrary, in Step S1302 described above, when the access range is "public" (NO in Step S1302), the virtual printer service 211 advances the processing to Step S1304.

In Step S1304, the virtual printer service 211 sets the access range of the virtual printer to be activated to "public", and in Step S1305, activates the virtual printer.

Figure 19:
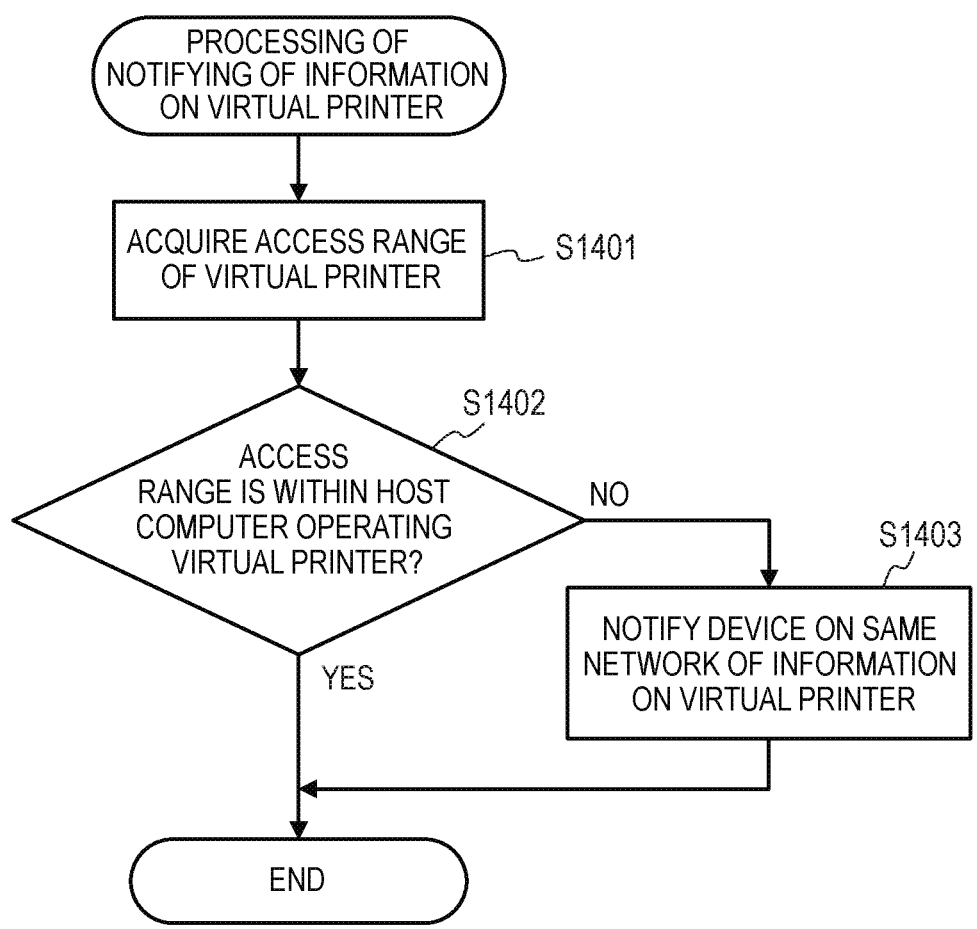
FIG. 19 is flow chart for illustrating an example of processing of notifying a device on the network of information on the virtual printer in the second embodiment of the disclosure.

FIG. 19 is a flow chart for illustrating an example of processing of notifying a device in the network of information on a virtual printer in the second embodiment. As described above, the virtual printer uses the Bonjour protocol to notify the OS 210 of the host computer 101 operating the virtual printer of the printer name of the virtual printer (e.g., notification of 2001 or notification of 2009 of FIG. 15). In response to this, the OS 210 of the host computer 101 notifies a device on the network to which the host computer 101 is connected of information based on the notification. When the OS 210 in the second embodiment has received a notification of printer information (including printer name of virtual printer, for example) by using the Bonjour protocol from the virtual printer, the OS 210 executes the processing of this flow chart. Now, a case of notifying a device on the network of information on the virtual printer A 311 is described as an example. However, the same holds true for other virtual printers.

In Step S1401, the OS 210a of the host computer 101a acquires information on the access range of the virtual printer A 311 being a notification source of the received printer information.

Next, in Step S1402, the OS 210a determines the access range acquired in Step S1401 described above. Then, when the access range is "within host computer operating virtual printer" (YES in Step S1402), the OS 210a ends the processing of this flow chart.

On the contrary, in Step S1402 described above, when the access range is "public" (NO in Step S1402), the OS 210a advances the processing to Step S1403.

In Step S1403, the OS 210a uses the technology of Multicast DNS to notify a device on the same network of the IP address, device name, and service type of the virtual printer A 311. That is, printer information is notified to a device on the same network in accordance with the Bonjour protocol. Then, the OS 210a ends the processing of this flow chart.

Figure 20A:
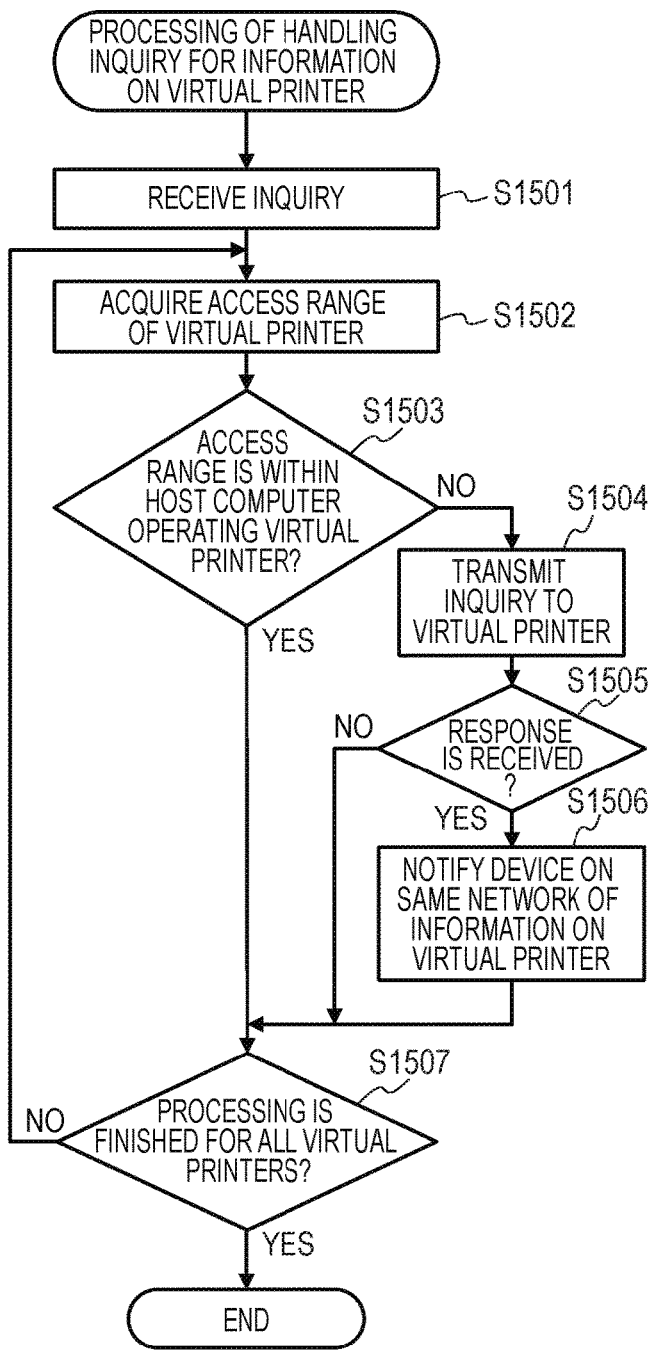
FIG. 20A is a flow chart for illustrating an example of processing of handling an inquiry for a supported service from a device on the same network in the second embodiment.
Figure 20B:
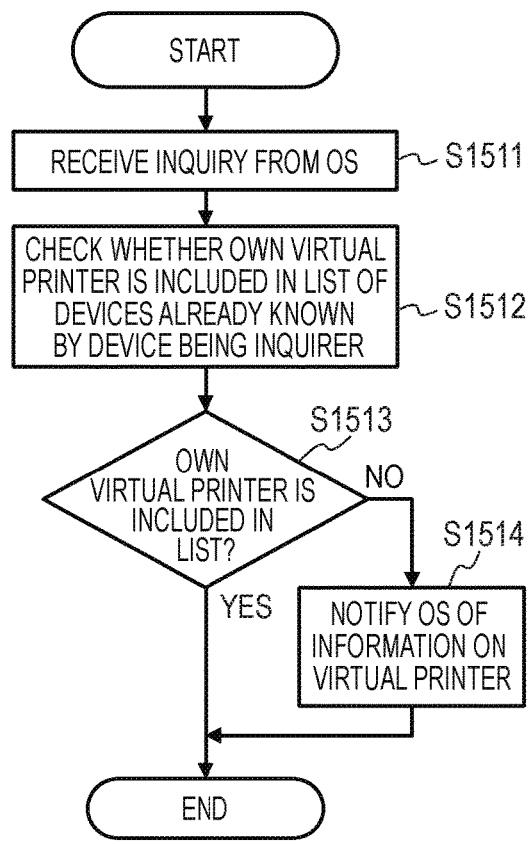
FIG. 20B is a flow chart for illustrating an example of processing to be executed by the virtual printer in response to the inquiry for the supported service from the device on the same network in the second embodiment.

FIG. 20A and FIG. 20B are flow charts for illustrating an example of processing for an inquiry for a supported service from a device on the same network in the second embodiment. The processing of FIG. 20A is started by the OS 210 of the host computer 101 operating the virtual printer.

First, the flow chart of FIG. 20A is described. Now, the host computer 101a is described as an example. However, the same holds true for other host computers.

In Step S1501, the OS 210a of the host computer 101a uses the technology of Multicast DNS to receive an inquiry for the supported service from the host computer 101b and a list of devices already known by the host computer 101b. That is, a device search request based on the Bonjour protocol is received. In response to this reception, the OS 210a performs such control as to execute processing of from Step S1502 to Step S1506 for each virtual printer generated in the host computer 101a.

First, in Step S1502, the OS 210a acquires one unprocessed virtual printer (hereinafter referred to as "processing target virtual printer") from among virtual printers generated in the host computer 101a. Further, the OS 210a acquires information on the access range of the processing target virtual printer.

Next, in Step S1503, the OS 210a determines the access range acquired in Step S1502 described above. Then, when the access range is limited to the host computer operating the processing target virtual printer (YES in Step S1503), the OS 210a advances the processing to Step S1507.

On the contrary, in Step S1503 described above, when no limitation is set on the access range (NO in Step S1502), the OS 210a advances the processing to Step S1504.

In Step S1504, the OS 210a uses the technology of Multicast DNS to transmit, to the processing target virtual printer, the inquiry for the supported service from the host computer 101b received in Step S1501 described above, and a list of devices already known by the host computer 101b. That is, a device search request from the outside, which is based on the Bonjour protocol, is transmitted to the processing target virtual printer.

Now, processing to be executed by the virtual printer that has received an inquiry in Step S1504 described above is described with reference to FIG. 20B. Now, the virtual printer A 311 is described as an example. However, the same holds true for other virtual printers.

In Step S1511, the virtual printer A 311 receives an inquiry (search request) transmitted by the OS 210a in Step S1504 described above, which is based on the Bonjour protocol, and a list of devices already known by the host computer 101b.

Next, in Step S1512, the virtual printer A 311 acquires the list of devices already known by the host computer 101b.

Next, in Step S1513, the virtual printer A 311 determines whether the virtual printer A 311 is included in the list of devices already known by the host computer 101b in Step S1512 described above.

In Step S1513 described above, when the virtual printer A 311 is included in the list of devices already known by the host computer 101b (YES in Step S1513), the virtual printer A 311 ends the processing of this flow chart. In this case, the virtual printer A 311 does not respond to the inquiry received in Step S1511 described above.

On the contrary, when the virtual printer A 311 is not included in the list of devices already known by the host computer 101b (NO in Step S1513), the virtual printer A 311 advances the processing to Step S1514.

In Step S1514, the virtual printer A 311 uses the technology of Multicast DNS to notify the OS 210a of the IP address, device name, and service type of the virtual printer A 311. That is, printer information is returned in accordance with the Bonjour protocol, and the processing of this flow chart is brought to an end.

Now, the description returns to the flow chart of FIG. 20A.

In Step S1505, the OS 210a determines whether the OS 210a has received a response (IP address, device name, and service type of processing target virtual printer) to the inquiry transmitted in Step S1504 described above from the processing target virtual printer. When there is no response from the processing target virtual printer (NO in Step S1505), the OS 210a advances the processing to Step S1507.

On the contrary, when the OS 210*a* has received a response from the processing target virtual printer (YES in Step S1505), the OS 210*a* advances the processing to Step S1506.

In Step S1506, the OS 210*a* uses the technology of Multicast DNS to notify a device on the same network of the IP address, device name, and service type of the processing target virtual printer, which are received in Step S1505 described above. That is, printer information is returned in accordance with the Bonjour protocol. After the processing of Step S1506, the OS 210*a* advances the processing to Step S1507.

In Step S1507, the OS 210*a* determines whether the processing illustrated in Step S1502 to Step S1506 described above is finished for all the virtual printers generated in the host computer 101*a*. When there is a virtual printer for which the processing is not finished yet (NO in Step S1507), the OS 210*a* returns to the processing of Step S1502, and transitions to processing for a next virtual printer.

On the contrary, when the processing illustrated in Step S1502 to Step S1506 described above is finished for all the virtual printers generated in the host computer 101*a* (YES in Step S1507), the OS 210*a* ends the processing of this flow chart.

There may be adopted a configuration of executing the processing of FIG. 19 and avoiding executing the processing of FIG. 20A and FIG. 20B. That is, there may be adopted a configuration in which the host computer 101 passes a device search request received from the outside to the internal virtual printer, but does not return a response from the virtual printer to the outside. Also with this configuration, it is possible to obtain a similar effect.

Further, in the above description of the configuration, the OS 210 of the host computer 101 determines the access range of the virtual printer, and does not transmit a notification from the virtual printer to the outside of the access range, and does not pass a search request from the outside of the access range to the virtual printer. However, the disclosure included in the second embodiment is not limited thereto. For example, the OS 210 may execute processing similar to that of the first embodiment, and the virtual printer may determine the access range of the virtual printer itself and avoid giving a notification to the outside of the access range or avoid responding to a search request from the outside of the access range.

As described above, in the second embodiment, processing that depends on the access range of the virtual printer is performed, and the access range is set to the host computer operating the virtual printer, to thereby prevent the virtual printer from responding to a search from a device on the network. With this configuration, in the second embodiment, a host computer other than a host computer operating the virtual printer cannot find its virtual printer. Thus, when the processing of registering a printer in the OS is performed, a virtual printer generated in a host computer other than the host computer operating the virtual printer that is executing the processing of registering a printer in the OS is not displayed on the printer registration screen of FIG. 12B. With this, it is possible to prevent the user from erroneously registering a virtual printer created in another host computer in the OS. As a result, it is possible to prevent such a phenomenon that when a virtual printer created in another computer is selected for printing, printing cannot be executed because another host computer is not activated.

In this manner, according to each embodiment, it is possible to transmit, to an image forming apparatus that does not support a specific protocol, a print job that can be interpreted by the image forming apparatus from a printing system that enables printing without using a printer driver. Further, it is possible to suppress a situation in which the user erroneously registers a virtual printer created in another host computer in the OS. As a result, it is possible to suppress such a phenomenon that when a virtual printer created in another computer is selected for printing, printing cannot be executed because another host computer is not activated.

The function of each piece of software of the host computer 101 described in each embodiment described above is implemented by the CPU 201 loading a program (for example, 210, 211, and 401) read or downloaded from, for example, an external memory onto the RAM 202, and executing the program. That is, each piece of software in each embodiment described above is used for causing the information processing apparatus to implement the function of each embodiment described above.

The configuration and details of various kinds of pieces of data described above are not limited to this, and it is to be understood that those pieces of data may have various kinds of configurations or details depending on the application or purpose.

Embodiments of the disclosure have been described above, but the disclosure may be embodied as a system, an apparatus, a method, a program, or a storage medium, for example. Specifically, the disclosure may be applied to a system formed of a plurality of devices, or to an apparatus formed of one device.

Further, all configurations obtained by combining the above-mentioned embodiments are encompassed in the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the aspect of the embodiments may be applied to a system formed of a plurality of devices, or may be applied to an apparatus formed of one device.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-101508, filed May 30, 2019, which is hereby incorporated by reference herein in its entirety.

What is claimed is:

1. An apparatus including at least one processor and at least one memory storing an application and an operating system, the application configured to cause the processor to execute:
searching for a printer via a network;
receiving a selection of one of printers found by the searching from a user;
generating a virtual printer on the application, the virtual printer corresponding to the selected printer;
notifying the operating system of the registered information of the virtual printer, wherein the information of the virtual printer in the application is to be registered in the operating system;
receiving data to be printed by the printer corresponding to the virtual printer from the operating system that has registered the information of the virtual printer; and
transmitting the data to the printer corresponding to the virtual printer.

2. The apparatus according to claim 1,
wherein the receiving includes receiving the data to be printed in accordance with a specific protocol, and
wherein the transmitting includes transmitting the data to the selected printer that does not support the specific protocol in accordance with a protocol different form the specific protocol.

3. The apparatus according to claim 1, wherein the application causes the processor to convert the data to be printed from a specific format to a different format before transmitting the data.

4. The apparatus according to claim 1, wherein the information includes a name of the virtual printer including a name of the selected printer and including information indicating a virtual device.

5. The apparatus according to claim 1, wherein the information includes a name of the virtual printer including a name of the selected printer and including information of the apparatus.

6. The apparatus according to claim 1, wherein the operating system presents, to a user, a list of names of printers including the name of the virtual printer, and based on a selection by the user of the virtual printer from the list, the information of the virtual printer is registered in the operating system.

7. The apparatus according to claim 6, wherein the printers are printers found by the operating system from a network.

8. The apparatus according to claim 1, wherein the notifying is performed when a device search request from the operating system is received by the application.

9. The apparatus according to claim 1,
wherein the application causes the processor to set an access range of the virtual device to a predetermined range,
wherein the application does not cause the processor to respond to a device search request when the device search request is received from an outside of the predetermined range.

10. The apparatus according to claim 9, wherein the predetermined range is an inside of the apparatus operating the virtual device.

11. The apparatus according to claim 1, wherein the application causes the processor to display on a display of the apparatus information of the printers found by the searching, and based on the received selection of the printer from among the printers from the user, the virtual printer is generated.

12. The apparatus according to claim 11, wherein the printers whose information is displayed are selected from among the printers found by the searching based on a list that indicates printers that support a specific protocol.

13. The apparatus according to claim 11, wherein the printers whose information is displayed are selected from among the printers found by the searching based on a list that indicates printers that do not support a specific protocol.

14. The apparatus according to claim 1, wherein the application causes the processor to generate a screen including information of the printers found by the searching, displays the screen on the display, receives the selection of the one of the printers via the screen and based on the received selection of the printer from among the printers from the user, the virtual printer is generated.

15. A method performed by an apparatus including an operating system executing an application, the method comprising:
searching for a printer via a network;
receiving a selection of one of printers found by the searching from a user;
generating a virtual printer on the application, the virtual printer corresponding to the selected printer;
notifying the operating system of the registered information of the virtual printer, wherein the information of the virtual printer in the application is to be registered in the operating system;
receiving data to be printed by the printer corresponding to the virtual printer from the operating system that has registered the information of the virtual printer; and
transmitting the data to the printer corresponding to the virtual printer.

16. The method according to claim 15,
wherein the receiving includes receiving the data to be printed in accordance with a specific protocol, and
wherein the transmitting includes transmitting the data to the selected printer that does not support the specific protocol in accordance with a protocol different form the specific protocol.

17. The method according to claim 15, wherein the application converts the data to be printed from a specific format to a different format before transmitting the data.

18. The method according to claim 15, wherein the information includes a name of the virtual printer including a name of the selected printer and including information indicating a virtual device.

19. The method according to claim 15, wherein the information includes a name of the virtual printer including a name of the selected printer and including information of the apparatus.

20. The method according to claim 15, wherein the operating system presents, to a user, a list of names of printers including the name of the virtual printer, and based on a selection by the user of the virtual printer from the list, the information of the virtual printer is registered in the operating system.

21. The method according to claim 20, wherein the printers are printers found by the operating system from a network.

22. The method according to claim 15, wherein the notifying is performed when a device search request from the operating system is received by the application.

23. The method according to claim 15, wherein the application displays on a display of the apparatus information of the printers found by the searching, and based on the received selection of the printer from among the printers from the user, the virtual printer is generated.

24. The method according to claim 15, wherein the application generates a screen including information of the printers found by the searching, displays the screen on the display, receives the selection of the one of the printers via the screen and based on the received selection of the printer from among the printers from the user, the virtual printer is generated.

25. A non-transitory recording medium storing an application to be installed in an apparatus including an operating system, and causing the apparatus to perform operations comprising:
searching for a printer via a network;
receiving a selection of one of printers found by the searching from a user;
generating a virtual printer on the application, the virtual printer corresponding to the selected printer;
notifying the operating system of the registered information of the virtual printer, wherein the information of the virtual printer in the application is to be registered in the operating system;
receiving data to be printed by the printer corresponding to the virtual printer from the operating system that has registered the information of the virtual printer; and
transmitting the data to the printer corresponding to the virtual printer.

26. The non-transitory recording medium according to claim 25,
wherein the receiving includes receiving the data to be printed in accordance with a specific protocol, and
wherein the transmitting includes transmitting the data to the selected printer that does not support the specific protocol in accordance with a protocol different form the specific protocol.

27. The non-transitory recording medium according to claim 25, wherein the application converts the data to be printed from a specific format to a different format before transmitting the data.

28. The non-transitory recording medium according to claim 25, wherein the information includes a name of the virtual printer including a name of the selected printer and including information indicating a virtual device.

29. The non-transitory recording medium according to claim 25, wherein the information includes a name of the virtual printer including a name of the selected printer and including information of the apparatus.

30. The non-transitory recording medium according to claim 25, wherein the operating system presents, to a user, a list of names of printers including the name of the virtual printer, and based on a selection by the user of the virtual printer from the list, the information of the virtual printer is registered in the operating system.

31. The non-transitory recording medium according to claim 30, wherein the printers are printers found by the operating system from a network.

32. The non-transitory recording medium according to claim 25, wherein the notifying is performed when a device search request from the operating system is received by the application.

33. The non-transitory recording medium according to claim 25, wherein the application displays on a display of the apparatus information of the printers found by the searching, and based on the received selection of the printer from among the printers from the user, the virtual printer is generated.

34. The non-transitory recording medium according to claim 25, wherein the and based on the received selection of the printer from among the printers from the user, the virtual printer is generated.

* * * * *